US012779819B2

(12) United States Patent
Takahashi

(10) Patent No.: US 12,779,819 B2

(45) Date of Patent: Nov. 3, 2026

(54) FIBER PREFORM, FIBER PREFORM PRECURSOR, AND METHOD FOR MANUFACTURING FIBER PREFORM

(71) Applicant: Mitsubishi Electric Corporation, Tokyo (JP)

(72) Inventor: Ichiya Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 248 days.

(21) Appl. No.: 18/839,463

(22) PCT Filed: Mar. 4, 2022

(86) PCT No.: PCT/JP2022/009552

§ 371 (c)(1),
(2) Date: Aug. 19, 2024

(87) PCT Pub. No.: WO2023/166737

PCT Pub. Date: Sep. 7, 2023

(65) Prior Publication Data

US 2025/0162277 A1 May 22, 2025

(51) Int. Cl.

*B32B 7/09* (2019.01)
*B32B 1/00* (2024.01)

(Continued)

(52) U.S. Cl.

CPC .................. *B32B 7/09* (2019.01); *B32B 1/00* (2013.01); *B32B 3/266* (2013.01); *B32B 5/02* (2013.01);

(Continued)

(58) Field of Classification Search

CPC ..... Y10T 428/24025; Y10T 428/24033; Y10T 428/24058; Y10T 428/24074;

(Continued)

(56) References Cited

U.S. PATENT DOCUMENTS

2009/0050259 A1 2/2009 Joern et al.
2009/0068428 A1 * 3/2009 Shinoda .................. B29B 11/16 428/212

(Continued)

FOREIGN PATENT DOCUMENTS

JP 2009-502547 A 1/2009
JP 2014-100911 A 6/2014
JP 2015-183186 A 10/2015

OTHER PUBLICATIONS

International Search Report and Written Opinion mailed on May 24, 2022, received for PCT Application PCT/JP2022/009552, filed on Mar. 4, 2022, 10 pages including English Translation.

(Continued)

*Primary Examiner* — Maria V Ewald
*Assistant Examiner* — Ethan A. Utt
(74) *Attorney, Agent, or Firm* — XSENSUS LLP

(57) ABSTRACT

A fiber preform includes first fiber tows located in a first area on a base, a second fiber tow located in a second area on the base other than the first area and stitched onto the base with a water-insoluble fixing thread, and a fixer located across the first fiber tows to fix parts of the first fiber tows to the base. The fixer is a third fiber tow stitched onto the base with a water-insoluble fixing thread, or the fixer is a glue or an elastic adhesive. The first fiber tows are displaceable relative to one another. The first area is displaceable relative to the second area.

12 Claims, 28 Drawing Sheets

(51) Int. Cl.

| | |
|---|---|
| ***B32B 3/26*** | (2006.01) |
| ***B32B 5/02*** | (2006.01) |
| ***B32B 5/26*** | (2006.01) |
| ***B32B 7/12*** | (2006.01) |

(52) U.S. Cl.
CPC .................. *B32B 5/26* (2013.01); *B32B 7/12* (2013.01); *B32B 2307/7375* (2023.05)

(58) Field of Classification Search
CPC ..... Y10T 428/24091; Y10T 428/24107; Y10T 428/24116; Y10T 428/24124; Y10T 428/24132; B32B 1/00; B32B 5/00; B32B 5/022; B32B 5/04; B32B 5/06; B32B 5/073; B32B 5/12; B32B 5/22; B32B 5/24; B32B 5/26; B32B 5/265; B32B 5/266; B32B 7/00; B32B 7/04; B32B 7/08; B32B 7/09; B32B 7/12; B29B 11/00; B29B 11/14; B29B 11/16; B29C 70/00; B29C 70/02; B29C 70/028; B29C 70/04; B29C 70/06; B29C 70/08; B29C 70/088; B29C 70/10; B29C 70/16; B29C 70/20; B29C 70/205; B29C 70/22; B29C 70/222; B29C 70/226; B29C 70/228; B29C 70/24; B29C 70/68
USPC ........ 428/101, 102, 105, 107, 109, 111, 112, 428/113, 114
See application file for complete search history.

(56) References Cited

U.S. PATENT DOCUMENTS

| | | | | |
|---|---|---|---|---|
| 2009/0096119 A1* | 4/2009 | Joern | .................... B29C 70/226 264/29.2 |
| 2010/0126652 A1* | 5/2010 | Joern | .................... B29C 70/382 156/93 |
| 2015/0266268 A1 | 9/2015 | Coxon | |

OTHER PUBLICATIONS

Extended European Search Report of Mar. 19, 2025, in the corresponding EP patent application1 7pp.

* cited by examiner

FIBER PREFORM, FIBER PREFORM PRECURSOR, AND METHOD FOR MANUFACTURING FIBER PREFORM

CROSS-REFERENCE TO RELATED APPLICATION

This application is a national stage application, pursuant to 35 U.S.C. § 371, of International Patent Application No. PCT/JP2022/009552, filed Mar. 4, 2022, the entire contents of which are incorporated herein by reference.

TECHNICAL FIELD

The present disclosure relates to a fiber preform for fiber reinforced plastics, a fiber preform precursor for the fiber preform, and a method for manufacturing the fiber preform.

BACKGROUND ART

A sandwich structure including a fiber reinforced plastic layer as an outer layer is used for, for example, an end bell for a power generator. An example of a fiber preform as a protruding outer layer may be a fiber fabric or a fiber preform formed by tailored fiber placement (hereafter, TFP).

With TFP, a fiber tow is stitched onto a base with fixing threads to be integral with the base for manufacturing a fiber preform, as described in Patent Literature 1.

CITATION LIST

Patent Literature

Patent Literature 1: Unexamined Japanese Patent Application Publication No. 2014-100911

SUMMARY OF INVENTION

Technical Problem

The fiber preform with the fiber tow stitched onto the base with fixing threads is formed in a mold. When the fiber preform to be formed in the mold has a curved profile, the fiber tow may be longer or shorter than the mold. With the fiber tow longer or shorter than the mold, the fiber preform may wrinkle. Known fiber preforms thus have low formability.

Under such circumstances, an objective of the present disclosure is to provide a fiber preform with high formability, a fiber preform precursor for the fiber preform, and a method for manufacturing the fiber preform.

Solution to Problem

A fiber preform according to an aspect of the present disclosure includes first fiber tows located in a first area on a base, a second fiber tow located in a second area on the base other than the first area and stitched onto the base with a water-insoluble fixing thread, and a fixer located across the first fiber tows to fix parts of the first fiber tows to the base. The fixer is a third fiber tow stitched onto the base with a water-insoluble fixing thread, or the fixer is a glue or an elastic adhesive. The first fiber tows are displaceable relative to one another. The first area is displaceable relative to the second area.

Advantageous Effects of Invention

In the above aspect of the present disclosure, the parts of the fiber tows in the first area remain unseparated from the base and fixed to allow displacement of the fiber tows relative to one another. The first fiber tows are thus displaceable relative to one another, and the first area is displaceable relative to the second area. The fiber preform in the above aspect, a fiber preform precursor for the fiber preform, and a method for manufacturing the fiber preform have higher formability.

DESCRIPTION OF EMBODIMENTS

Figure 1:
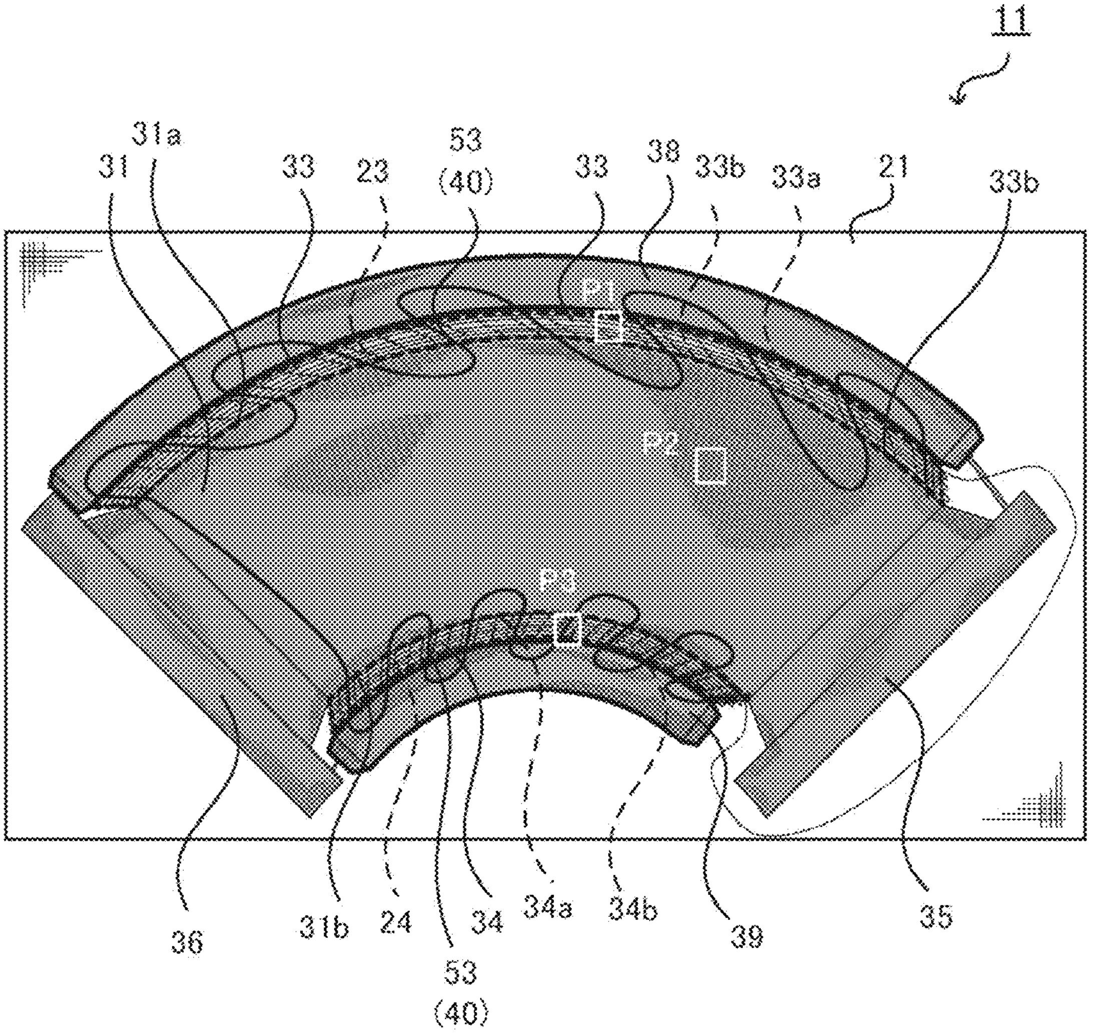
FIG. 1 is a schematic diagram of a fiber preform precursor according to Embodiment 1.

A fiber preform, a fiber preform precursor, and a method for manufacturing the fiber preform and the fiber preform precursor according to one or more embodiments of the present disclosure are described in detail below with reference to the drawings. Same reference signs denote same or corresponding components in the drawings.

Embodiment 1

Figure 2A:
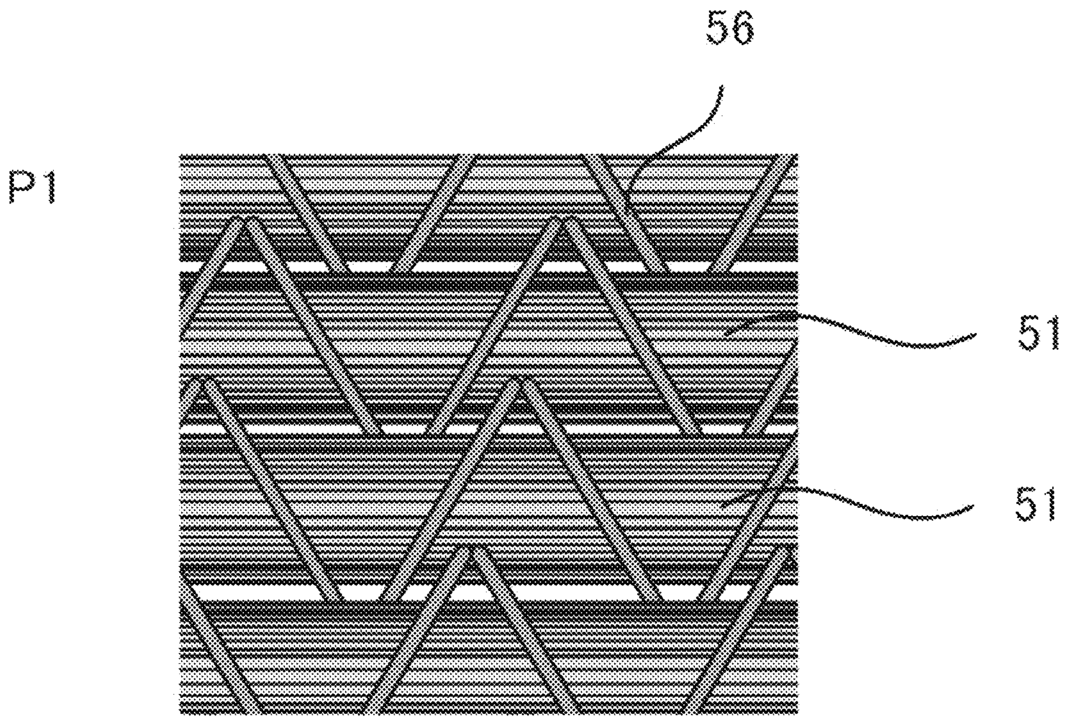
FIG. 2A is an enlarged partial view of area P1 in FIG. 1.
Figure 2B:
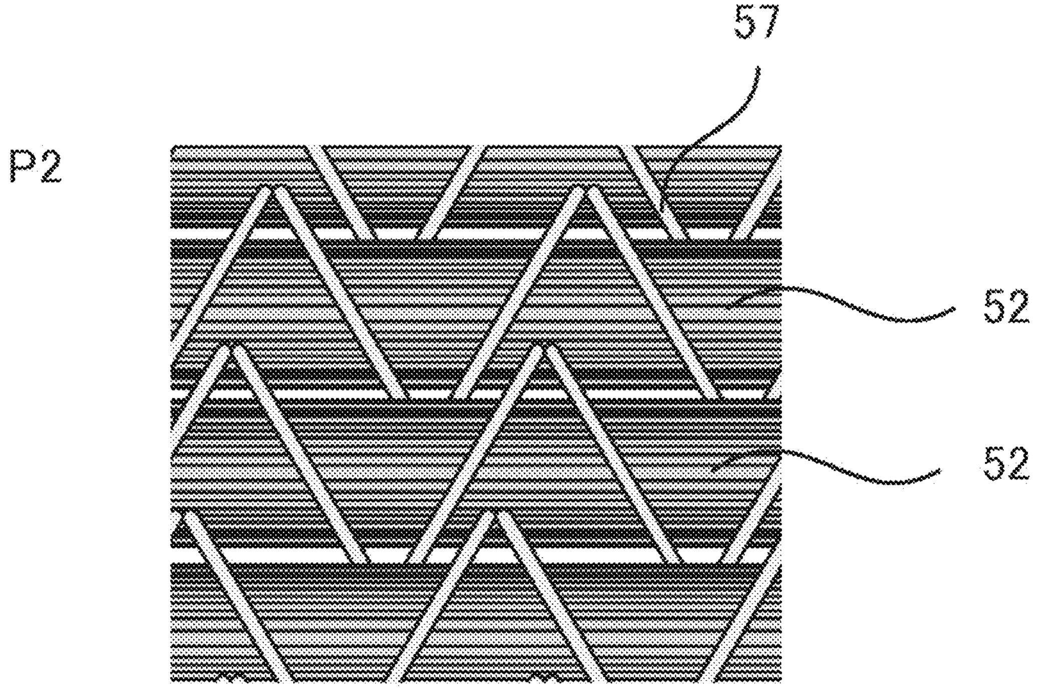
FIG. 2B is an enlarged partial view of area P2 in FIG. 1.
Figure 2C:
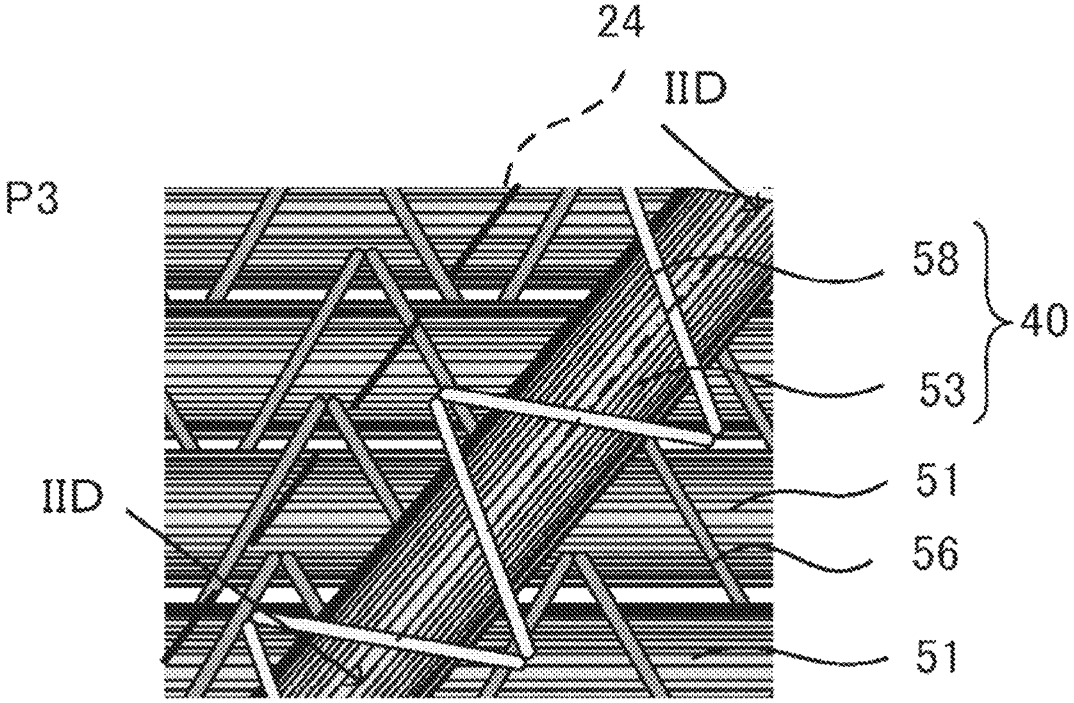
FIG. 2C is an enlarged partial view of area P3 in FIG. 1.

FIG. 1 is a schematic diagram of a fiber preform precursor 11 according to Embodiment 1. FIGS. 2A to 2C are enlarged views of areas P1 to P3 in FIG. 1. The fiber preform precursor 11 is manufactured during manufacture of a fiber preform 12 according to Embodiment 2. The fiber preform 12 manufactured using the fiber preform precursor 11 is used as a protruding outer layer of a sandwich panel being a partial disk with a central angle of 90°. The fiber preform precursor 11 or the fiber preform 12 is flat and is formed into a protruding shape. The partial-disk sandwich panel is used as, for example, an end bell for a power generator. The sandwich panel may have a different degree of the central angle or a different shape from the example described in the embodiment.

Figure 25:
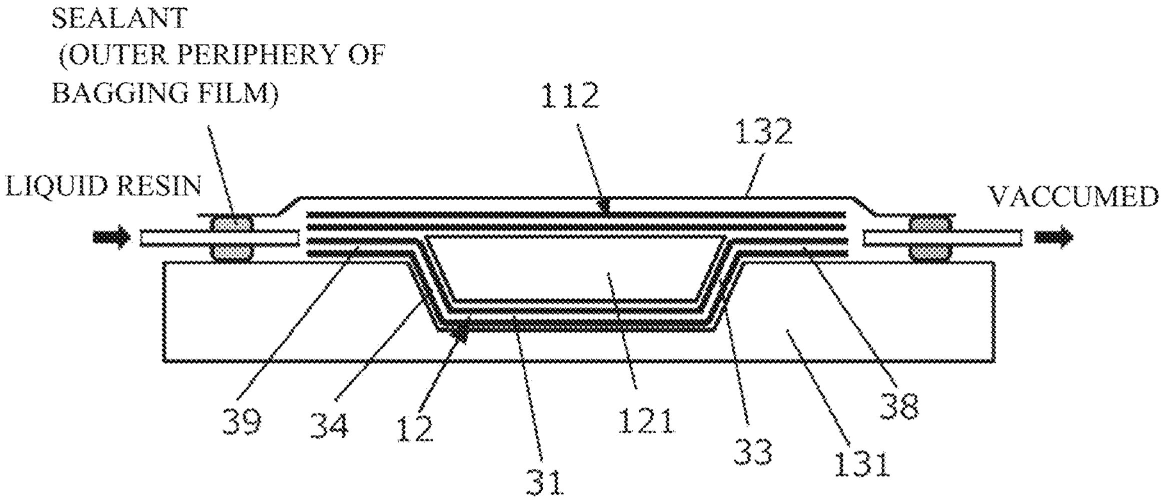
FIG. 25 is a schematic diagram illustrating a method for manufacturing a sandwich panel in an embodiment of the present disclosure.

The sandwich panel is manufactured, for example, in the manner described below. As illustrated in FIG. 25, a fiber preform 12 for a protruding outer layer is placed on a female mold 131. A foam core 121 and a fiber preform 112 for a smooth outer layer are placed on the fiber preform 12 to hold the foam core 121 between the fiber preforms 12 and 112. The foam core 121 between the fiber preforms 12 and 112 and the mold 131 are then covered with a bagging film 132. A liquid resin is injected into spaces between the mold 131 and the bagging film 132. The liquid resin cures to complete the sandwich panel.

As illustrated in FIG. 1, the fiber preform precursor 11 includes a base 21 including a fiber fabric, a center portion 31 including fiber tows and water-insoluble fixing threads, an outer taper portion 33 including fiber tows and water-soluble fixing threads, an inner taper portion 34 including fiber tows and water-soluble fixing threads, side portions 35 and 36 each including fiber tows and water-insoluble fixing threads, an outer flange portion 38 including fiber tows and water-insoluble fixing threads, and an inner flange portion 39 including fiber tows and water-insoluble fixing threads.

The center portion 31, the outer taper portion 33, the inner taper portion 34, the outer flange portion 38, and the inner flange portion 39 each have the shape of a part cut from a ring. The outer taper portion 33 extends along an outer periphery 31*a* of the center portion 31, and the outer flange portion 38 extends along the outer periphery of the outer taper portion 33. The inner taper portion 34 extends along an inner periphery 31*b* of the center portion 31, and an inner flange portion 39 extends along the inner periphery of the inner taper portion 34. The side portions 35 and 36 are located at both ends of the center portion 31. When the sandwich panel is completed, as illustrated in FIG. 25, the center portion 31 is located on a protruding flat portion of the foam core, the outer taper portion 33 is located on an outer slope of the foam core, the inner taper portion 34 is located on an inner slope of the foam core, the outer flange portion 38 is located as an outer flange, and the inner flange portion 39 is located as an inner flange.

Figure 4:
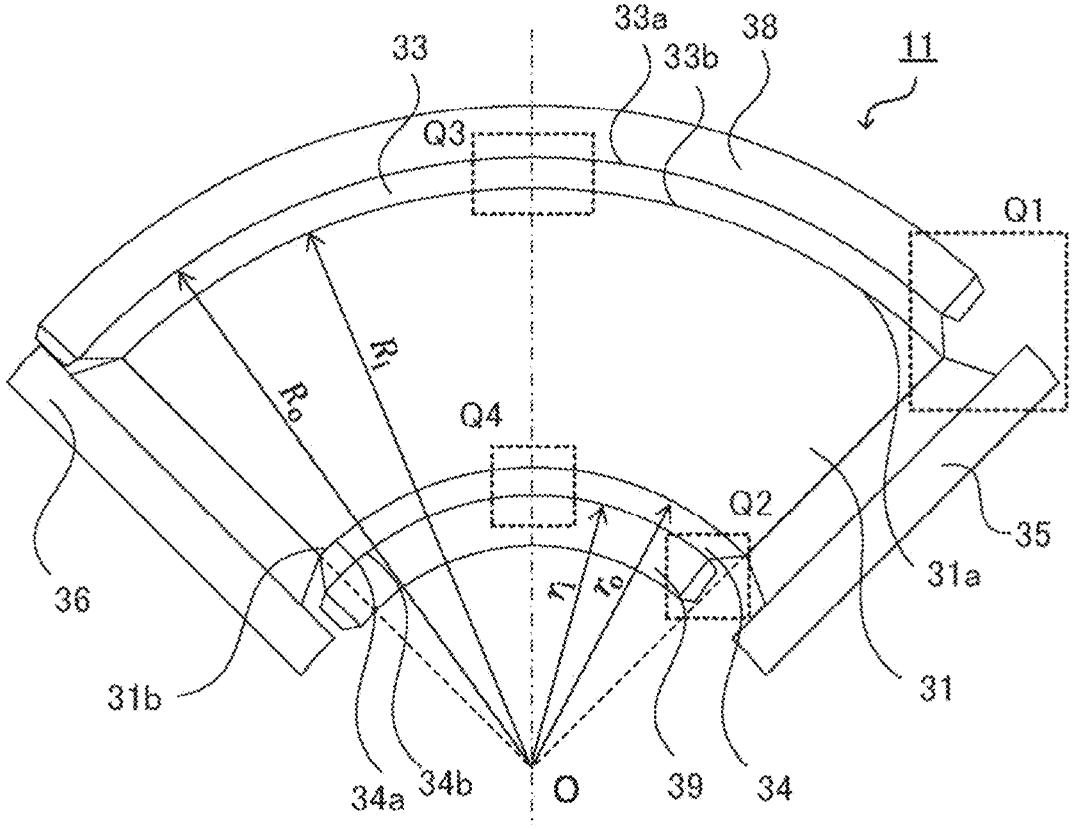
FIG. 4 is a diagram of the fiber preform precursor according to Embodiment 1 with the dimensions.

FIG. 4 illustrates the fiber preform precursor 11 with the dimensions. As illustrated in FIG. 4, an outer periphery 33*a* of the outer taper portion 33 is an arc centered on a point O with an outer diameter $R_o$. An inner periphery 33*b* of the outer taper portion 33 is an arc centered on the point O with an inner diameter $R_i$. An outer periphery 34*a* of the inner taper portion 34 is an arc centered on the point O with an outer diameter $r_o$. An inner periphery 34*b* of the inner taper portion 34 is an arc centered on the point O with an inner diameter r.

Figure 7:
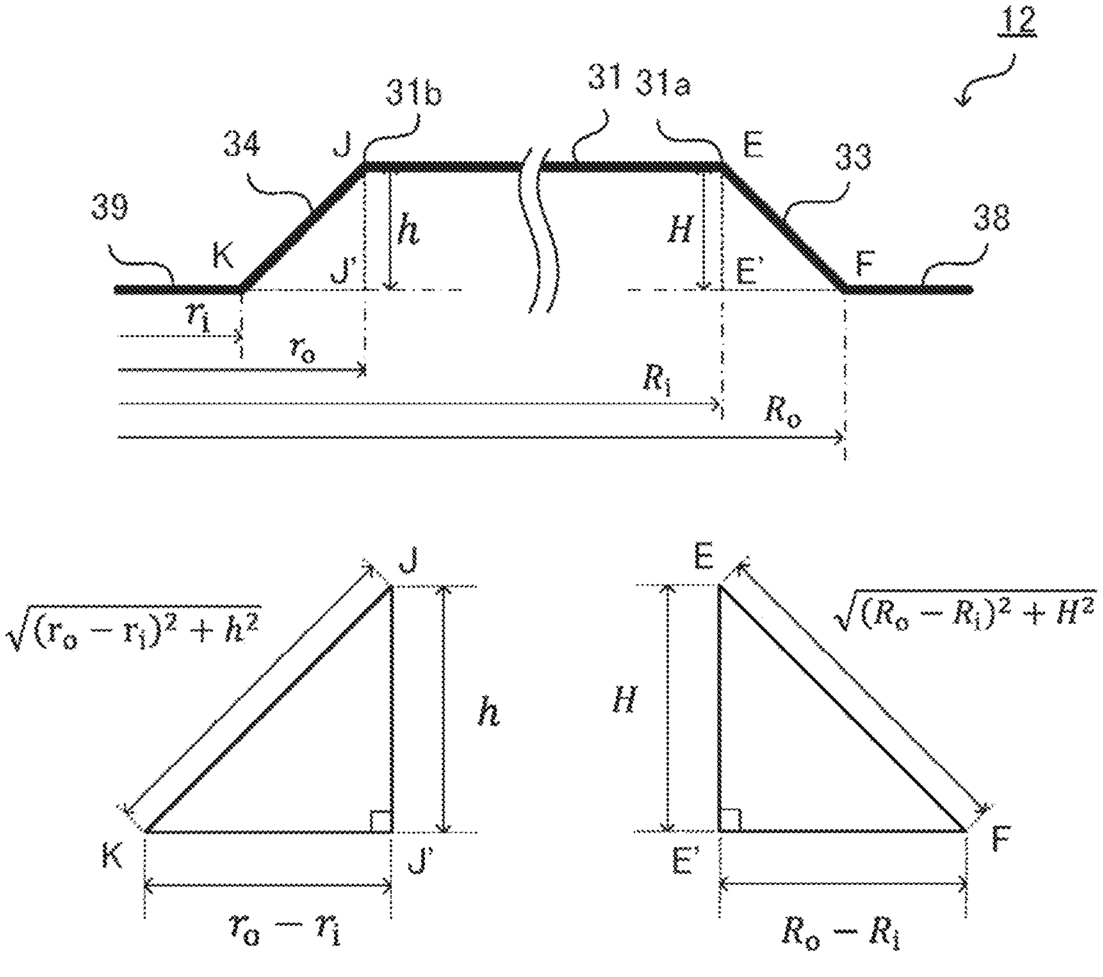
FIG. 7 is a diagram of a fiber preform after forming using the fiber preform precursor according to Embodiment 1 illustrating the dimensions.

The dimensions of the center portion 31, the outer taper portion 33, and the inner taper portion 34 after the fiber preform 12 is formed are described. As illustrated in FIG. 7, the height of the outer periphery 31*a* of the center portion 31 is denoted with H, and the height of the inner periphery 31*b* of the center portion 31 after forming is denoted with h. In the present embodiment, the center portion 31 has a constant height on the inner and outer peripheries. The heights H and h are thus equal to each other.

Figure 10:
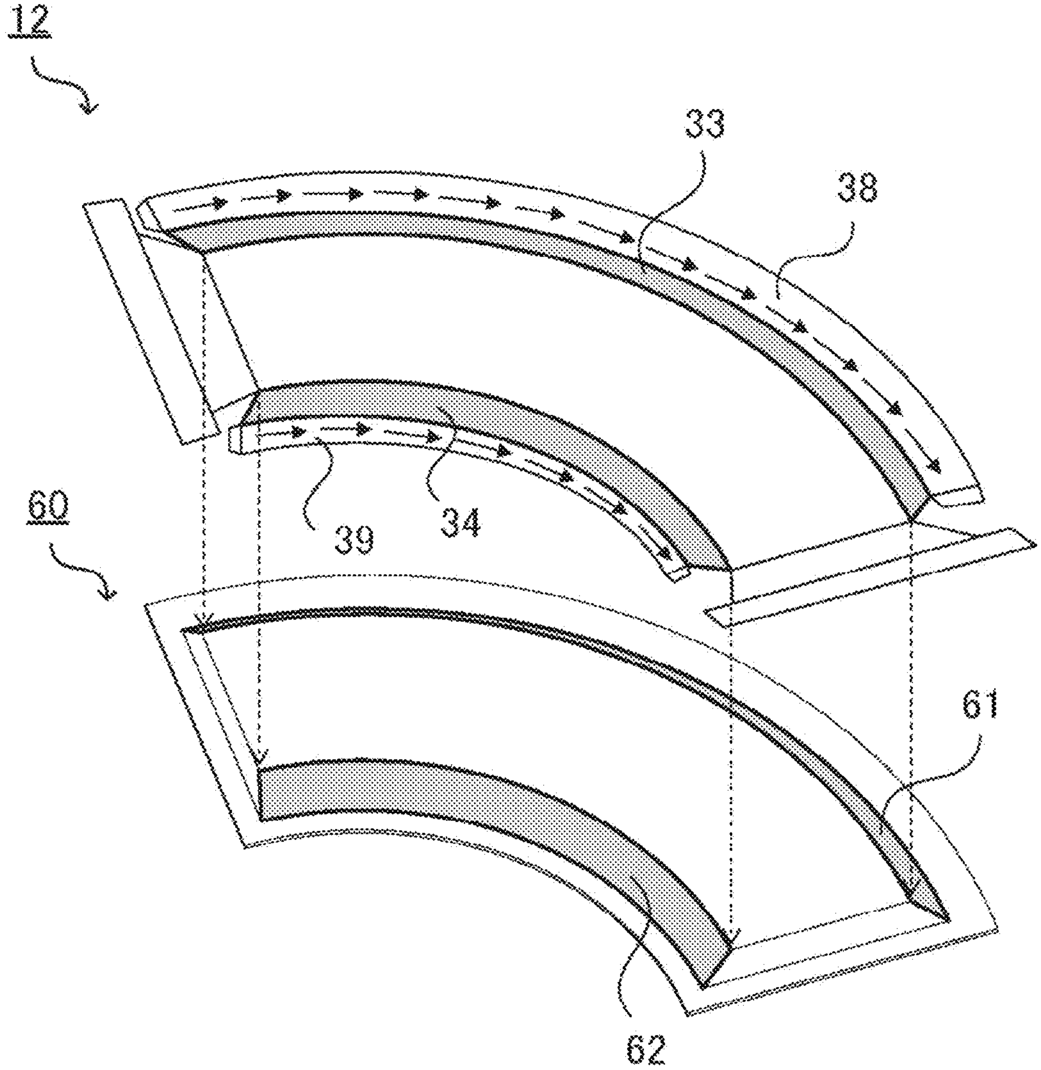
FIG. 10 is a schematic diagram illustrating a method for forming a fiber preform manufactured using the fiber preform precursor according to Embodiment 1.

As illustrated in FIG. 10, the fiber preform 12 according to Embodiment 2 manufactured using the fiber preform precursor 11 in FIG. 1 is formed with a forming mold 60. The forming mold 60 has conical surfaces 61 and 62 as illustrated in FIG. 10. The outer taper portion 33 in the fiber preform precursor 11 is formed into a conical surface along the conical surface 61, and the inner taper portion 34 is formed into a conical surface along the conical surface 62. The outer taper portion 33 and the inner taper portion 34 are thus tapered after formed into the sandwich panel. The outer taper portion 33 and the inner taper portion 34 in the fiber preform precursor 11 illustrated in FIG. 1 are yet to be inclined and are flat.

A fiber fabric may be used for the base 21. Examples of the fiber include glass fiber, carbon fiber, and para-aramid fiber, as well as organic fiber such as polyester fiber. The fiber tows are stitched onto portions of the base 21 with water-soluble or water-insoluble fixing threads. The fixing threads may include upper threads and lower threads. As indicated by the broken lines in FIG. 1, the base 21 has multiple dashed outer slits 23 and multiple dashed inner slits 24 in the respective portions to be the outer taper portion 33 or the inner taper portion 34.

The fiber tows are formed from glass fiber, carbon fiber, or para-aramid fiber. The fiber tows may be formed from organic fiber such as polyester fiber.

The fiber tows fixed to the base 21 with water-soluble fixing threads 56 are herein referred to as first fiber tows 51, and the fiber tows fixed to the base 21 with water-insoluble fixing threads 57 are herein referred to as second fiber tows 52. A fixer 40 is also located across the first fiber tows 51 to partially fix the first fiber tows 51. The fixer 40 in the present embodiment includes a fiber tow and water-insoluble fixing threads. The fiber tow in the fixer 40 is referred to as a third fiber tow 53. In the present embodiment, areas of the base 21 in which the first fiber tows 51 are located are referred to as first areas. Areas of the base 21 other than the first areas in which the second fiber tows 52 are located are referred to as second areas.

The first fiber tows 51, the second fiber tows 52, and the third fiber tow 53 may all be formed from the same material. Instead, any two of the first fiber tows 51, the second fiber tows 52, and the third fiber tow 53 may be formed from the same material, or the first fiber tows 51, the second fiber tows 52, and the third fiber tow 53 may all be formed from different materials.

Figure 2D:
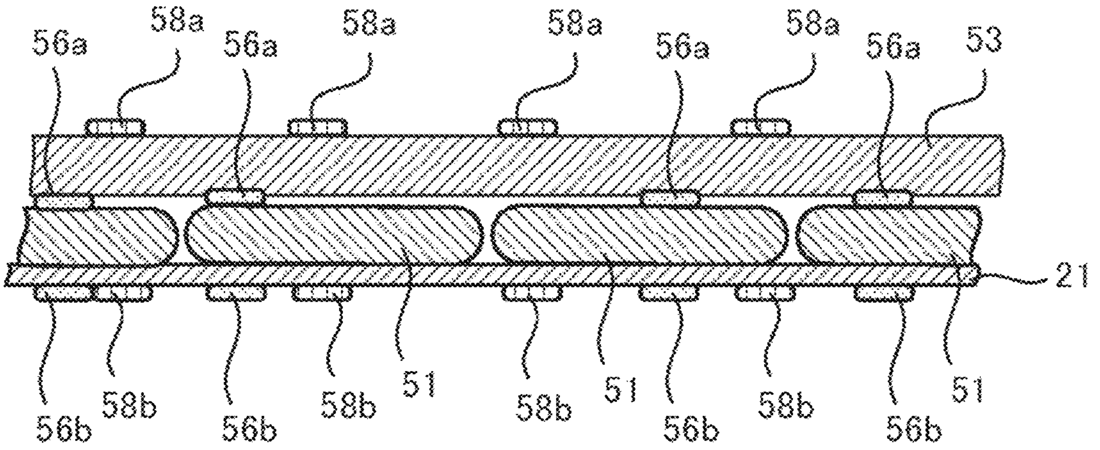
FIG. 2D is a cross-sectional view taken along line IID-IID in FIG. 2C.

As illustrated in FIG. 2A, the first fiber tows 51 are fixed to the base 21 with the water-soluble fixing threads 56. More specifically, as illustrated in FIG. 2D, the first fiber tows 51 are stitched with a water-soluble upper thread 56*a* and a water-soluble lower thread 56*b* to be fixed to the base 21. The water-soluble fixing threads 56 are removable with water, or for example, by immersing the threads in water or spraying the threads with water. The water-soluble fixing threads 56 may be formed from a water-soluble material, such as vinylon.

As illustrated in FIG. 2B, the second fiber tows 52 are fixed to the base 21 with the water-insoluble fixing threads 57. As in the example in FIG. 2D, the second fiber tows 52 are also stitched onto the base 21 with a water-insoluble upper thread and a water-insoluble lower thread. Examples of the material for the water-insoluble fixing threads 57 include glass fiber, carbon fiber, and para-aramid fiber, as well as organic fiber such as polyester fiber or nylon fiber.

As illustrated in FIG. 2C, the third fiber tow 53 is located across the first fiber tows 51. The third fiber tow 53 is fixed to the base 21 with water-insoluble fixing threads 58. As illustrated in FIG. 2D, the third fiber tow 53 is also stitched onto the base 21 with a water-insoluble upper thread 58*a* and a water-insoluble lower thread 58*b*. Parts of the first fiber tows 51 on which the third fiber tow 53 is provided are thus fixed to the base 21. The water-insoluble fixing thread 58 may be formed from the same material as or a different material from the water-insoluble fixing threads 57 for fixing the first fiber tows 51.

In the fiber preform precursor 11 according to the present embodiment, the first fiber tows 51 are fixed to the base 21 with the water-soluble fixing threads 56 as illustrated in FIG. 2A in the outer taper portion 33 and the inner taper portion 34, and the third fiber tow 53 fixed with the water-insoluble fixing threads 58 is located across the first fiber tows 51 fixed with the water-soluble fixing threads 56 as illustrated in FIG. 2C. Thus, areas of the base 21 in which the outer taper portion 33 and the inner taper portion 34 are located correspond to the first areas. In contrast, the second fiber tows 52 are fixed to the base with the water-insoluble fixing threads 57 in portions of the base 21 other than the outer taper 33 and the inner taper 34, or more specifically, in the center portion 31, the outer flange portion 38, the inner flange portion 39, and the side portions 35 and 36. Thus, the center portion 31, the outer flange 38, the inner flange 39, and the side portions 35 and 36 in the base 21 correspond to the second areas.

As illustrated in FIG. 1, the third fiber tow 53 extends from the outer periphery 33*a* to the inner periphery 33*b* of the outer taper portion 33, or from the inner periphery 33*b* to the outer periphery 33*a*. The same applies to the inner taper portion 34. The third fiber tow 53 extends from the outer periphery 34*a* to the inner periphery 34*b* of the inner taper portion 34, or from the inner periphery 34*b* to the outer periphery 34*a*.

In FIG. 1, the third fiber tow 53 is continuous as a single third fiber tow 53 crossing the outer taper portion 33 and the inner taper portion 34 multiple times. In some embodiments of the present disclosure, however, multiple third fiber tows 53 may be prepared to each extend from the outer periphery 33*a* to the inner periphery 33*b* of the outer taper portion 33, or from the inner periphery 33*b* to the outer periphery 33*a*. The same applies to the inner taper portion 34.

The water-soluble fixing threads 56 is removable from the fiber preform precursor 11 through dissolution in water during manufacture of the fiber preform 12. Thus, parts of the first fiber tows 51 overlapping the third fiber tow 53 in the fiber preform 12 are fixed. The first fiber tows 51 are thus displaceable relative to one another, and the first areas in which the first fiber tows 51 are located are displaceable relative to the second areas in which the second fiber tows 52 are located, thus providing higher formability. The fiber preform can eliminate creating a cutout or a separate member for reducing wrinkles, and thus can avoid lowering the rigidity of the product. In the embodiments of the present disclosure, being displaceable relative to one another or relative to the second areas refers to being changeable in terms of angles, positions, or both.

For the outer taper portion 33 to be formed along the conical surface 61 of the forming mold 60 in the above structure, the outer flange portion 38 may be rotated in the circumferential direction of the forming mold 60, or in the direction indicated by the arrows in FIG. 10, for forming. Similarly, for the inner taper portion 34 to be formed along the conical surface 62 of the forming mold 60, the inner flange portion 39 may be rotated in the circumferential direction of the forming mold 60, or in the direction indicated by the arrows in FIG. 10, for forming. Thus, the outer flange portion 38 and the inner flange portion 39 in the fiber preform precursor 11 may be displaced in a direction opposite to the direction of the force applied in forming. More specifically, the outer flange portion 38 is rotated in the circumferential direction of a circle centered on the center O with a radius $R_o$ in forming. The outer flange portion 38 may thus be rotated, for placement, in the circumferential direction of the circle centered on the point O with the radius $R_o$, or in the direction opposite to the direction of the force applied in forming.

In particular, the outer flange portion 38 may be rotated, for placement, in the circumferential direction of the circle centered on the point O with the radius $R_o$ by a height H of the outer periphery 31*a* of the center portion 31 after forming. In this case, the length of a rotation by which the outer flange portion 38 is rotated in the circumferential direction may be the same as the height H of the outer periphery 31*a* of the center portion 31 after forming.

Figure 5A:
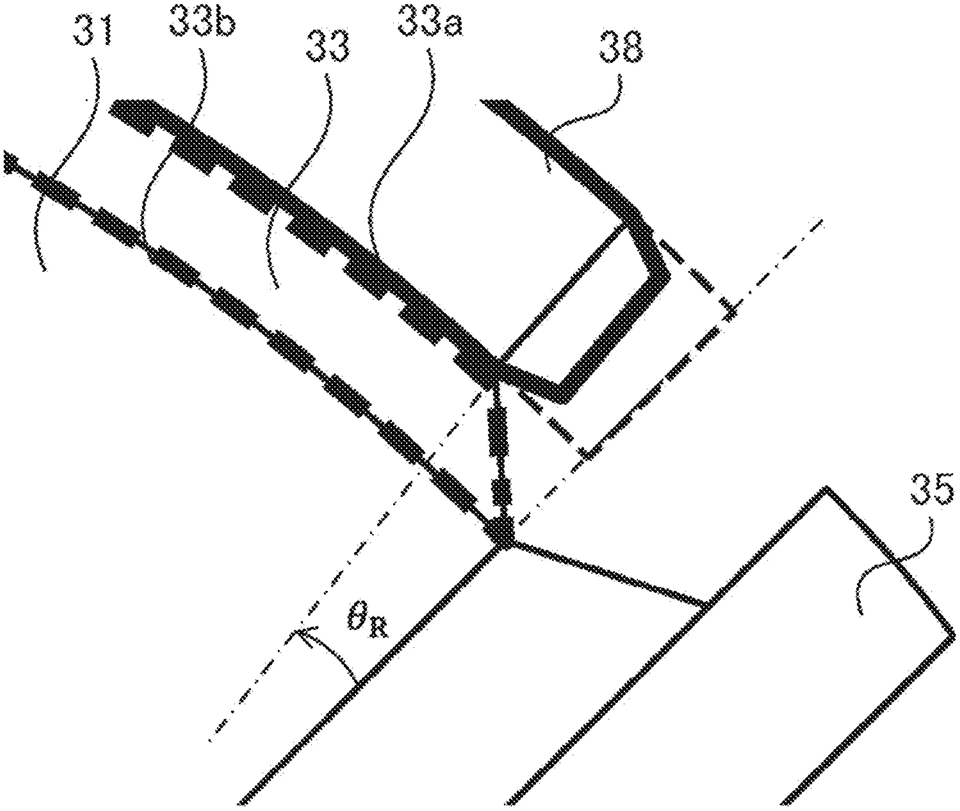
FIG. 5A is an enlarged partial view of area Q1 in FIG. 4.
Figure 6A:
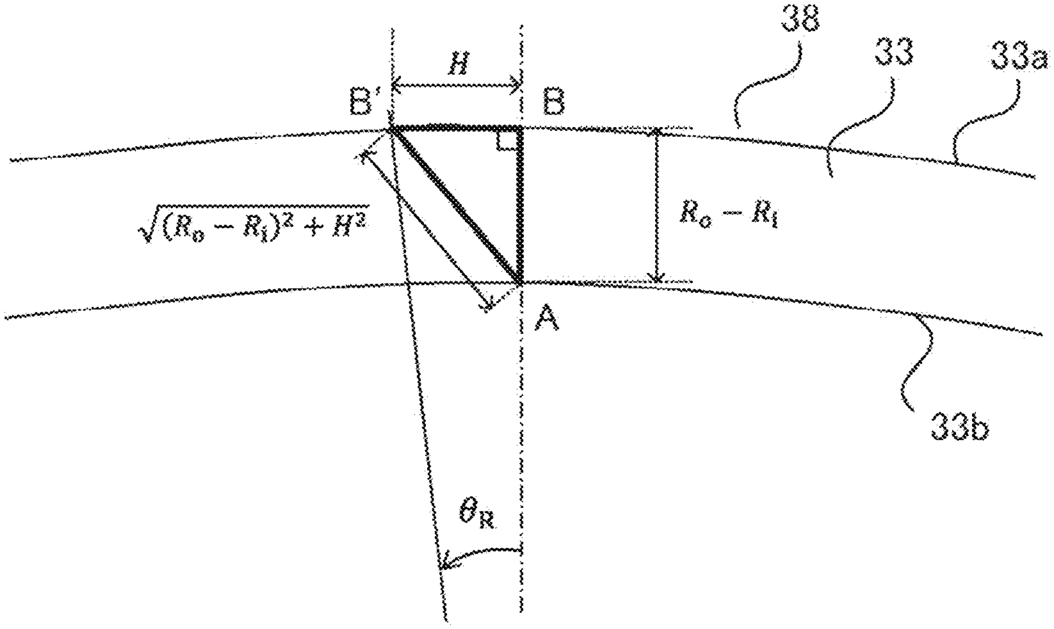
FIG. 6A is an enlarged partial view of area Q3 in FIG. 4.

As illustrated in FIG. 5A, the amount by which the outer flange portion 38 is rotated may be defined by an angle $\theta_R$ determined by Formula 1.1. In the formula, $R_o$ is the diameter of the outer periphery 33*a* of the outer taper portion 33, and H is the height of the outer periphery 31*a* of the center portion 31 after forming. In FIG. 6A, BB' indicates the length of the rotation, and AB indicates the width of the outer taper portion. With $R_o$ greater than H, as illustrated in FIG. 6A, the length of the rotation extends in a tangential direction and is substantially at right angles to a line OA extending from the center O. The angle is thus defined as in Formula 1.1, and ABB' is substantially a right triangle.

$$\theta_R = \tan^{-1}\frac{H}{R_o} \tag{1.1}$$

Similarly to the outer flange portion 38, the inner flange portion 39 may be rotated, for placement, by a height h of the inner periphery 31*b* of the center portion 31 after forming in the circumferential direction of a circle centered on the point O with a radius n. In this case, the length of a rotation by which the inner flange portion 39 is rotated in the circumferential direction may be the same as the height h of the inner periphery 31*b* of the center portion 31 after forming.

Figure 5B:
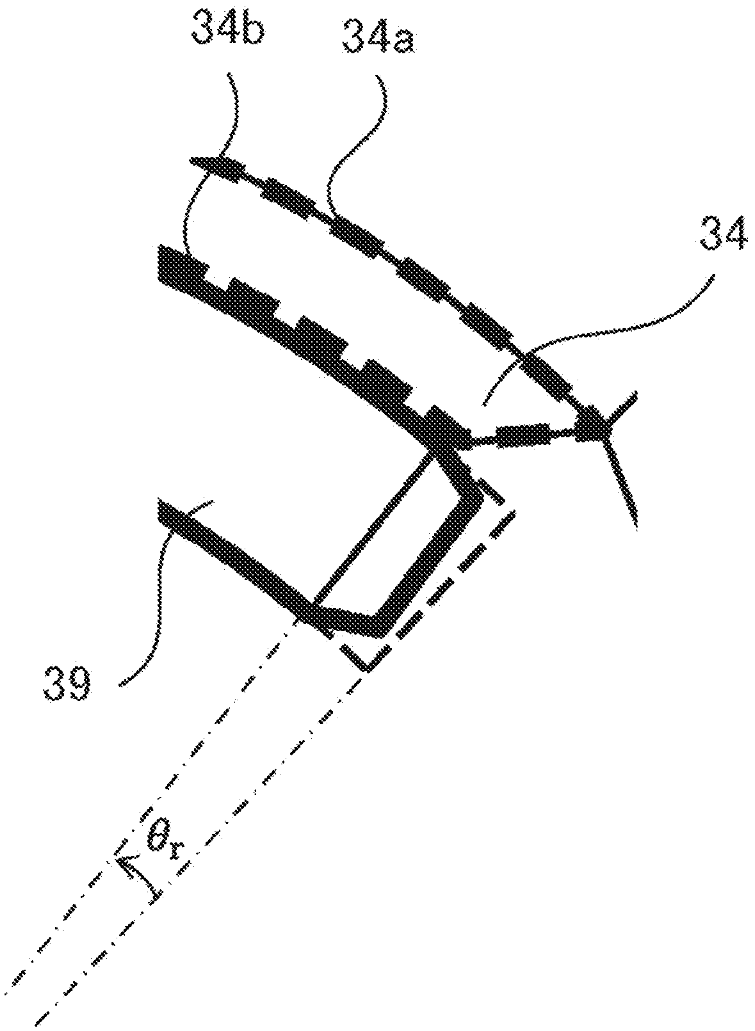
FIG. 5B is an enlarged partial view of area Q2 in FIG. 4.
Figure 6B:
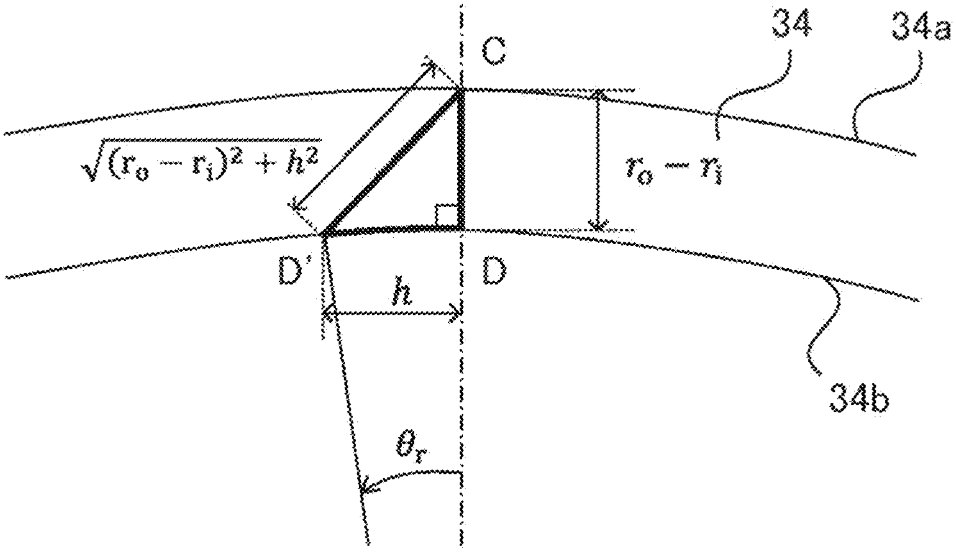
FIG. 6B is an enlarged partial view of area Q4 in FIG. 4.

Similarly to the outer flange portion, as illustrated in FIG. 5B, the amount by which the inner flange portion 39 is rotated may be defined by an angle $\theta_r$ determined by Formula 1.2 using the diameter $r_o$ of the inner periphery 34*b* of the inner taper portion 34 and the height h of the inner periphery of the center portion 31 after forming. In FIG. 6B, D-D' indicates the rotation periphery, and C-D indicates the width of the inner taper portion. With the diameter $r_o$ greater than the height h, as illustrated in FIG. 6B, the rotation periphery extends in a tangential direction and is substantially at right angles to a line extending from the center O. The angle is thus defined as in Formula 1.2, and CDD' is substantially a right triangle.

$$\theta_r = \tan^{-1}\frac{h}{r_i} \tag{1.2}$$

In forming, the outer flange portion 38 and the inner flange portion 39 are rotated in the direction indicated by the arrows in FIG. 10, or rightward in FIG. 10, to be formed. The outer flange portion 38 is rotated by $\theta_R$, and the inner flange portion 39 is rotated by $\theta_r$.

In particular, when the outer flange portion 38 and the inner flange portion 39 are placed in the above manner, the outer flange portion 38 is rotated, in forming, by $-\theta_R$ along the periphery centered on the point O with the radius $R_o$. As illustrated in FIG. 6A, this causes B' to move to a position B on a line extending from the point O through a point A. When the inner flange portion 39 is rotated by $-\theta_r$ along the periphery centered on the point O with the radius $r_r$, as illustrated in FIG. 6B, D' moves to a position D on a line extending from the point O through a point C. In this case, the distance between A and B' in the fiber preform precursor 11 before forming is $$\sqrt{(R_o \rightarrow R_i)^2 + H^2},$$

and the distance between C and D' is $$\sqrt{(r_o \rightarrow r_i)^2 + h^2}.$$

FIG. 7 schematically illustrates the height of the center portion 31 and the ridgelines of the outer taper portion 33 and the inner taper portion 34 after forming. As illustrated in FIG. 7, the outer periphery 31*a* of the center portion 31 after forming has the height H, and the inner periphery 31*b* of the center portion 31 after forming has the height h. As illustrated in FIG. 7, the distance between E and F is the difference between the outer diameter $R_o$ and the inner diameter R of the outer taper portion. The ridgeline EF of the outer taper portion thus has a length equal to the distance between A and B' in FIG. 6A. Similarly, the distance between J and K is the difference between the outer diameter $r_o$ and the inner diameter r of the inner taper portion. The ridgeline JK thus has a length equal to the distance between C and D' in FIG. 6B. With these relationships, the outer taper portion 33 and the inner taper portion 34 in the fiber preform 12 to be manufactured using the fiber preform precursor 11 can be formed appropriately with reduced wrinkles along the outer conical surface 61 and the inner conical surface 62 of the forming mold 60 for a partial-disk sandwich panel illustrated in FIG. 10.

The outer slits 23 and the inner slits 24 are located in the first areas on the base 21 in which the first fiber tows 51 are located. As illustrated in FIG. 1, the outer slits 23 and the inner slits 24 are located in the areas on the base 21 in which the outer taper portion 33 and the inner taper portion 34 are located. The outer slits 23 and the inner slits 24 are in dashed lines.

As illustrated in FIG. 1, the outer slits 23 in the outer taper portion 33 each extend from the outer periphery 33*a* of the outer taper portion 33 to the inner periphery 33*b* of the outer taper portion 33. Similarly, the inner slits 24 in the inner taper portion 34 each extend from the outer periphery 34*a* of the inner taper portion 34 to the inner periphery 34*b* of the inner taper portion 34. The outer slits 23 and inner slits 24 may have no overlap with the fixer 40. For example, as illustrated in FIG. 2C, the outer slits 23 and inner slits 24 may be spaced from the fixer 40.

For example, when each slit is a single line, or in other words, when each slit has a single opening, the base 21 may be displaced during stitching of the first fiber tows 51, decreasing the formability or workability. In contrast, the outer slits 23 and the inner slits 24 in dashed lines as in the present embodiment can reduce wrinkles on the base 21 or displacement of the base 21 when the first fiber tows 51 are stitched onto the base 21.

Figure 3:
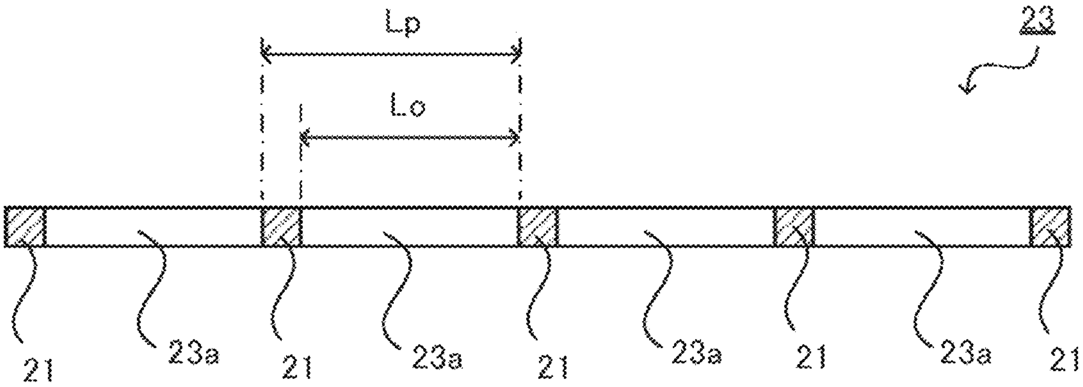
FIG. 3 is a schematic cross-sectional view of outer slits illustrated in FIG. 1.

As illustrated in FIG. 3, the outer slits 23 each include multiple linear openings 23*a* each having an opening width Lo and located linearly at a pitch Lp. The same applies to the inner slits 24. The length Lo of the openings 23*a* in the dashed outer slits 23 and the pitch Lp between the openings 23*a* illustrated in FIG. 3 may be set as appropriate. However, the length Lo of the openings 23*a* and the pitch Lp between the openings 23*a* may be set to values that allow the areas between the openings 23*a* to be cut off in forming and allow the openings 23*a* adjacent to one another to be connected to one another. The areas between the adjacent slits can undergo shearing deformation in the circumferential direction. This allows the outer taper portion 33 and the inner taper portion 34 to be formed appropriately along the conical surfaces 61 and 62 of the forming mold 60.

The outer slits 23 and the inner slits 24 may extend in any direction in the base 21 and may satisfy the relationships described below.

Figure 8A:
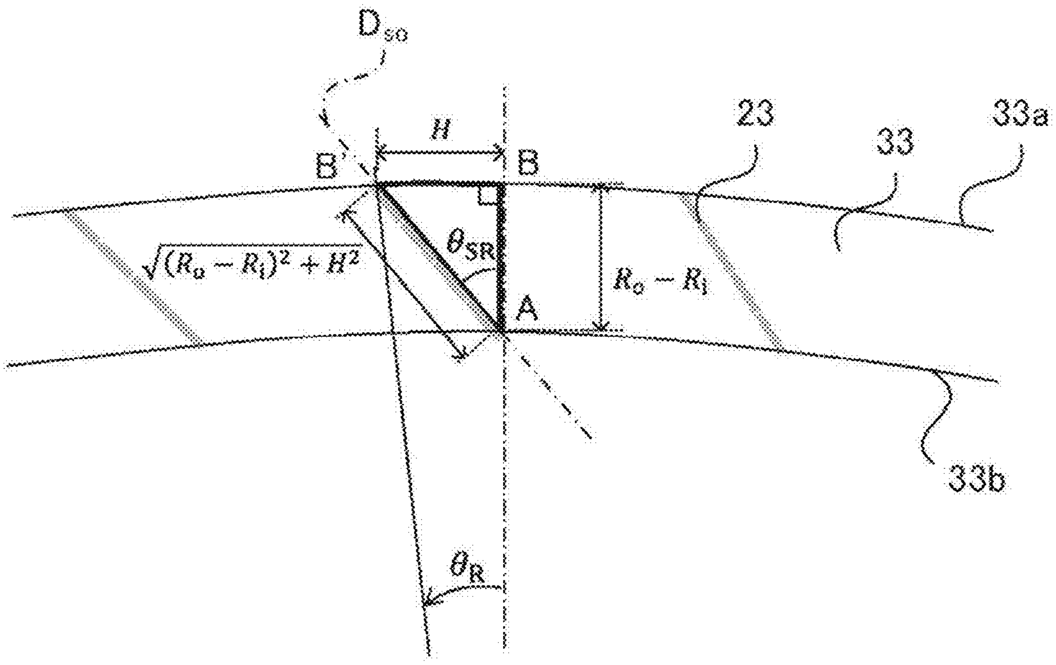
FIG. 8A is a diagram of the outer slits in Embodiment 1 illustrating the arrangement.

As illustrated in FIG. 8A, the outer slits 23 each extend from the outer periphery 33*a* of the outer taper portion 33 to the inner periphery 33*b* of the outer taper portion 33. As illustrated in FIG. 8A, an outer slit 23 is located on a line $D_{so}$. The line $D_{so}$ corresponding to the direction in which the outer slit 23 extends may form an angle $\theta_{SR}$ defined by Formula 1.3 with a line extending from the point O to an intersection at which the line $D_{so}$ intersects with the inner periphery 33*b*. In FIG. 8A, the outer slits 23 each extend from the outer periphery 33*a* to the inner periphery 33*b*.

Thus, the intersection at which the line $D_{so}$ and the inner periphery 33*b* intersect with each other corresponds to the point A in FIG. 8A.

$$\theta_{SR} = \tan^{-1}\frac{H}{R_o - R_i} \tag{1.3}$$

Figure 8B:
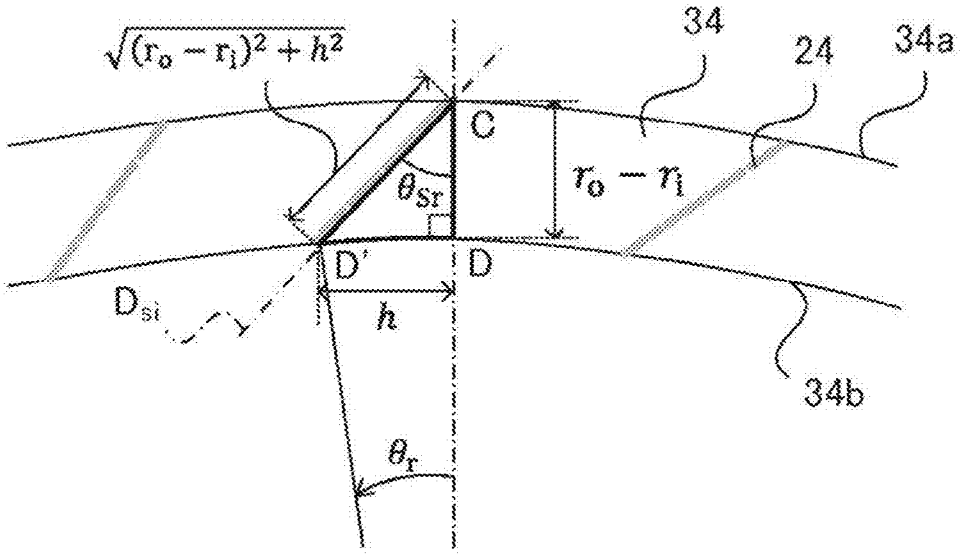
FIG. 8B is a diagram of inner slits in Embodiment 1 illustrating the arrangement.

As illustrated in FIG. 8B, the inner slits 24 each extend from the outer periphery 34*a* of the inner taper portion 34 to the inner periphery 34*b* of the inner taper portion 34. As illustrated in FIG. 8B, an inner slit 24 is located on a line $D_{si}$. The line $D_{si}$ corresponding to the direction in which the inner slit 24 extends may form an angle $\theta_{Sr}$ defined by Formula 1.4 with a line extending from the point O to an intersection at which the line $D_{si}$ intersects with the outer periphery 34*a*. In FIG. 8B, the inner slits 24 extend from the inner periphery 34*b* to the outer periphery 34*a*. Thus, the intersection at which the line $D_{si}$ and the outer periphery 34*a* intersect with each other corresponds to the point C in FIG. 8B.

$$\theta_{Sr} = \tan^{-1}\frac{h}{r_o \rightarrow r_i} \tag{1.4}$$

With the outer slits 23 and the inner slits 24 located at the above angles, as illustrated in FIG. 8A, the outer slits 23 have the same length as the ridgeline EF of the conical surface of the outer taper portion 33 after forming illustrated in FIG. 7. Similarly, the inner slits 24 have the same length as the ridgeline JK. Thus, in forming of the fiber preform 12 to be manufactured using the fiber preform precursor 11, the outer taper portion 33 and the inner taper portion 34 can be formed along the conical surfaces without wrinkles through shear deformation of portions of the base 21 located between adjacent slits.

Figure 9A:
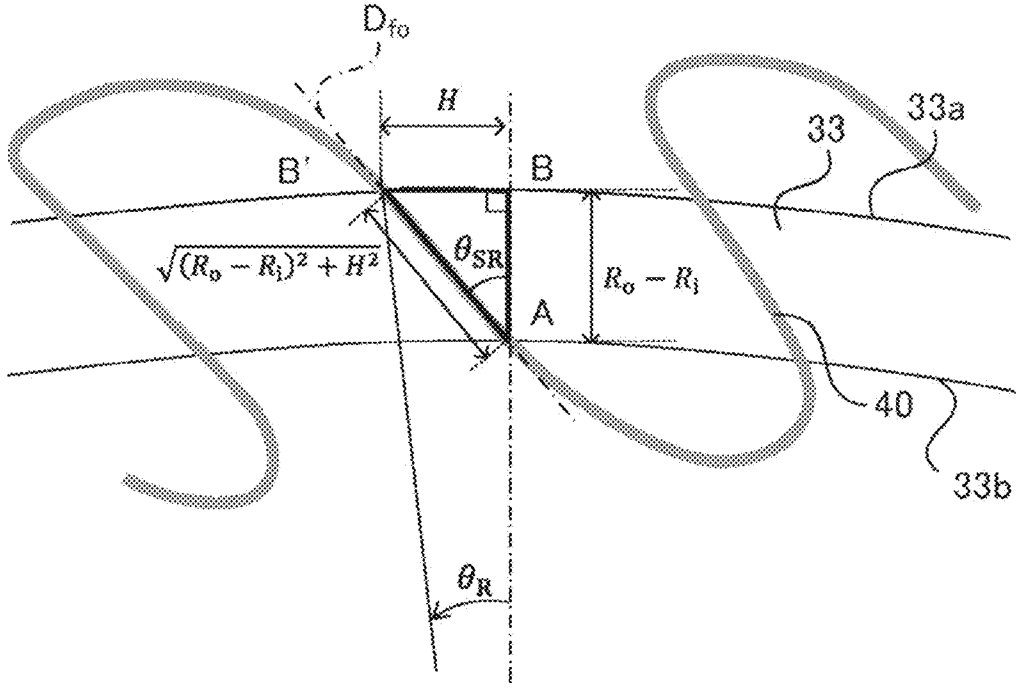
FIG. 9A is a diagram of a fixer on an outer taper portion in Embodiment 1 illustrating the arrangement.

Additionally, the fixer 40 may be placed at an angle satisfying the conditions below in the outer taper portion 33. As illustrated in FIG. 9A, the fixer 40 is placed on a line $D_{fo}$ in the outer taper portion 33. The line $D_{fo}$ intersects with the inner periphery 33*b* of the outer taper portion 33 at an intersection. A line extending from the point O to the intersection and the line $D_{fo}$ may be in a direction $\theta_{SR}$ defined by Formula 1.5. In FIG. 9A, the intersection at which the line $D_{fo}$ intersects with the inner periphery 33*b* of the outer taper portion 33 corresponds to the point A.

$$\theta_{SR} = \tan^{-1}\frac{H}{R_o - R_i} \tag{1.5}$$

Figure 9B:
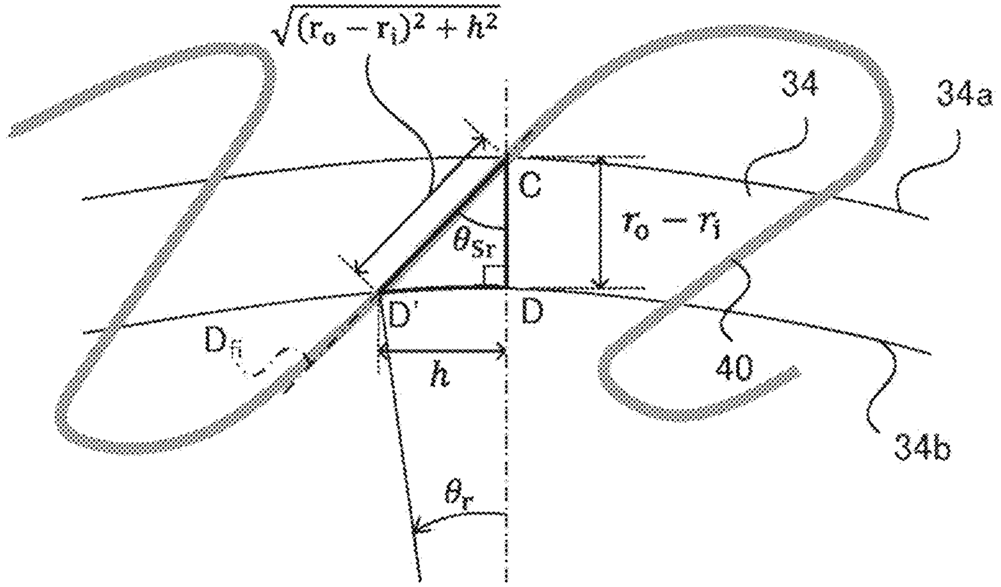
FIG. 9B is a diagram of the fixer on an inner taper portion in Embodiment 1 illustrating the arrangement.

Similarly, the fixer 40 may be placed at an angle satisfying the conditions below in the inner taper portion 34. As illustrated in FIG. 9B, the fixer 40 is placed on a line $D_{fi}$ in the inner taper 34. The line $D_{fi}$ intersects with the outer periphery 34*a* of the inner taper 34 at a point. A line extending from the point O to the point and the line $D_{fi}$ may be in a direction $\theta_{Sr}$ defined by Formula 1.6. In FIG. 9B, the point at which the line $D_{fo}$ intersects with the outer periphery 34*a* of the inner taper portion 34 corresponds to the point C.

$$\theta_{Sr} = \tan^{-1}\frac{h}{r_o - r_i} \tag{1.6}$$

In the fixer 40 placed in the above manner, as illustrated in FIG. 9A, the fixer 40 in the outer taper portion 33 can have the same length as the ridgeline EF of the conical surface of the outer taper portion 33 after forming as illustrated in FIG. 7. Similarly, the fixer 40 in the inner taper portion 34 can have the same length as the ridgeline JK. Thus, the fixed first fiber tows 51 are displaceable relative to one another, and parts of the first fiber tows 51 restricted by the fixer 40 can be placed on the same ridgeline of the conical surface of the outer taper portion 33 after forming. This allows the outer taper portion 33 and the inner taper portion 34 to appropriately form into the conical surfaces.

Embodiment 2

Figure 11:
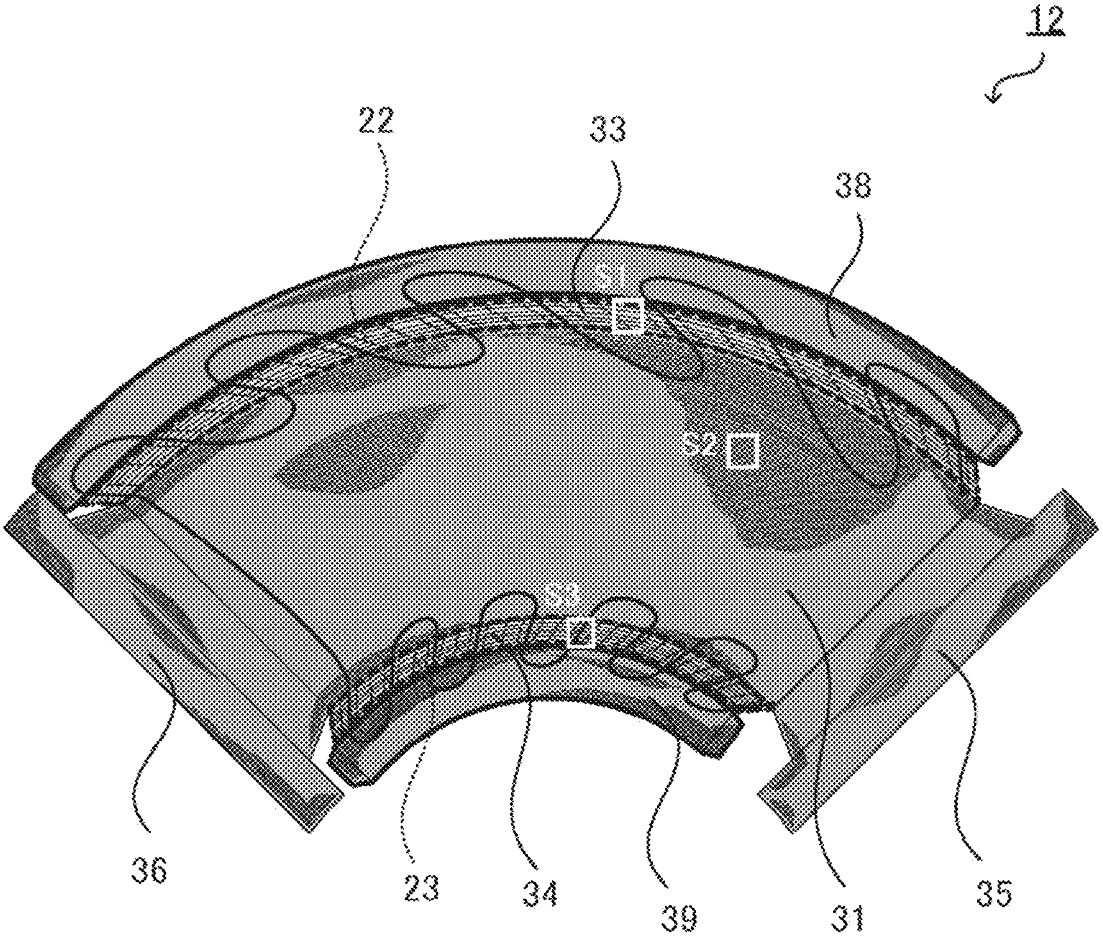
FIG. 11 is a schematic diagram of a fiber preform according to Embodiment 2.
Figure 12A:
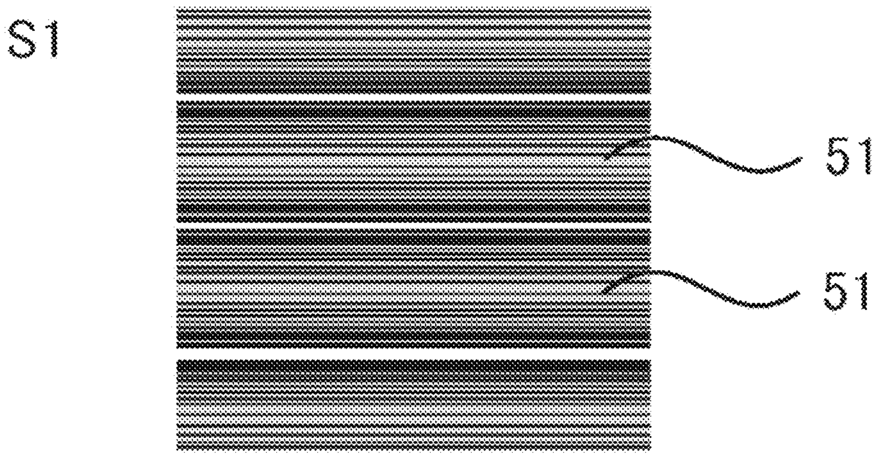
FIG. 12A is an enlarged partial view of area S1 in FIG. 11.
Figure 12B:
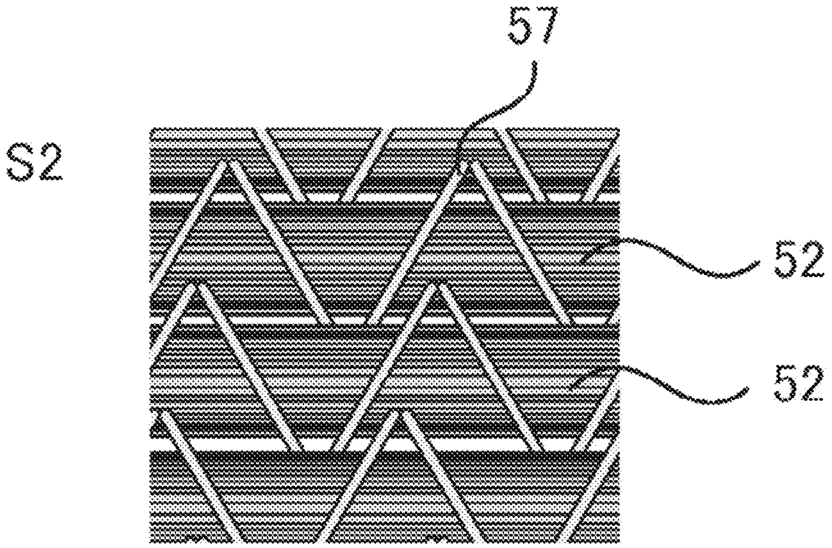
FIG. 12B is an enlarged partial view of area S2 in FIG. 11.
Figure 12C:
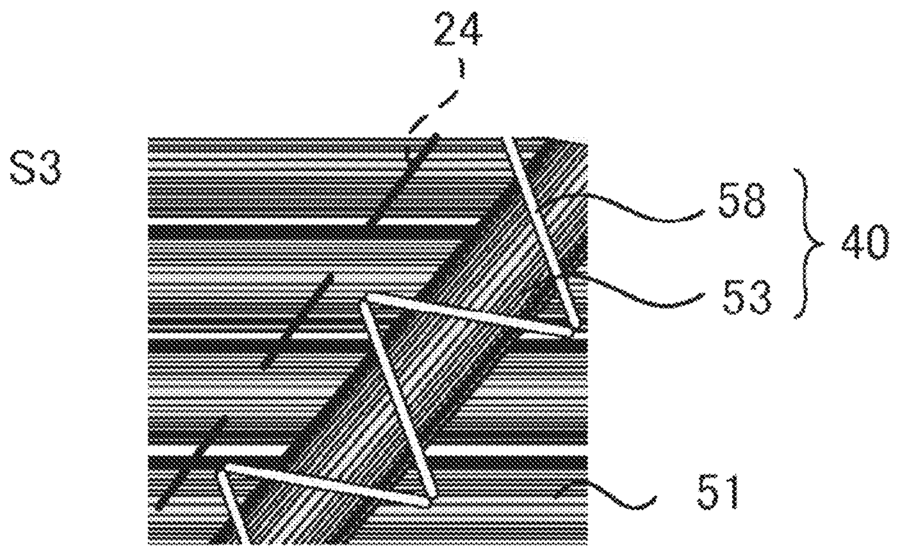
FIG. 12C is an enlarged partial view of area S3 in FIG. 11.

FIG. 11 illustrates a fiber preform 12 according to Embodiment 2. The fiber preform 12 according to the present embodiment is manufactured using the fiber preform precursor 11 according to Embodiment 1. FIGS. 12A to 12C are partially enlarged views of areas S1 to S3 in FIG. 11. Like reference signs denote features common with the features in Embodiment 1 and are not described in detail.

As illustrated in FIG. 11, in the fiber preform 12 according to the present embodiment, the portion of the base 21 including no fiber tow is cut off, unlike in the fiber preform precursor 11. More specifically, the base 21 remains in areas in which the center portion 31, the outer taper portion 33, the inner taper portion 34, the side portions 35 and 36, the outer flange portion 38, and the inner flange portion 39 are located.

As illustrated in FIGS. 12A and 12C, the water-soluble fixing threads 56 fixing the first fiber tows 51 to the base 21 are removed in the outer taper portion 33 and the inner taper portion 34. Parts of the first fiber tows 51 are fixed to the base 21 with the fixer 40. In contrast, as illustrated in FIG. 12B, the second fiber tows 52 are fixed to the base 21 with the water-insoluble fixing threads 57 in the center portion 31. Similarly, the second fiber tows 52 are fixed to the base 21 with the water-insoluble fixing threads 57 in the outer taper portion 33, the inner taper portion 34, and the side portions 35 and 36.

The first fiber tows 51 in the outer taper portion 33 and the inner taper portion 34 are thus displaceable relative to one another. However, with parts of the first fiber tows 51 fixed with the fixer 40, the first fiber tows 51 can remain unseparated from the base 21. The fiber preform 12 can thus have higher formability. This structure is particularly effective in forming a fiber preform into a shape with a curved surface. The outer flange portion 38, the inner flange portion 39, the outer slits 23, the inner slits 24, and the fixer 40 in the present embodiment may have the features described in Embodiment 1. This allows the outer taper portion 33 and the inner taper portion 34 to appropriately form into conical surfaces.

Embodiment 3

A fiber preform precursor 13 according to Embodiment 3 is described with reference to FIG. 13. The fiber preform precursor 13 according to the present embodiment is manufactured during manufacture of a fiber preform 14 according to Embodiment 4 described later. The fiber preform precursor 13 according to the present embodiment differs from Embodiments 1 and 2 as shown above in that a glue or an elastic adhesive is used as a fixer 41. Like reference signs denote features common with the features in Embodiment 1 and are not described in detail.

As in Embodiment 1, the fiber preform precursor 13 according to the present embodiment includes the base 21, the center portion 31, the outer taper portion 33, the inner taper portion 34, the side portions 35 and 36, the outer flange portion 38, and the inner flange portion 39. The first fiber tows 51 are fixed with the water-soluble fixing threads 56 in the outer taper portion 33 and the inner taper portion 34. The second fiber tows 52 are fixed with the water-insoluble fixing threads 57 in the center portion 31, the side portions 35 and 36, the outer flange portion 38, and the inner flange portion 39. The fiber preform precursor 13 also has the outer slits 23 and the inner slits 24 as in Embodiment 1.

Figure 14A:
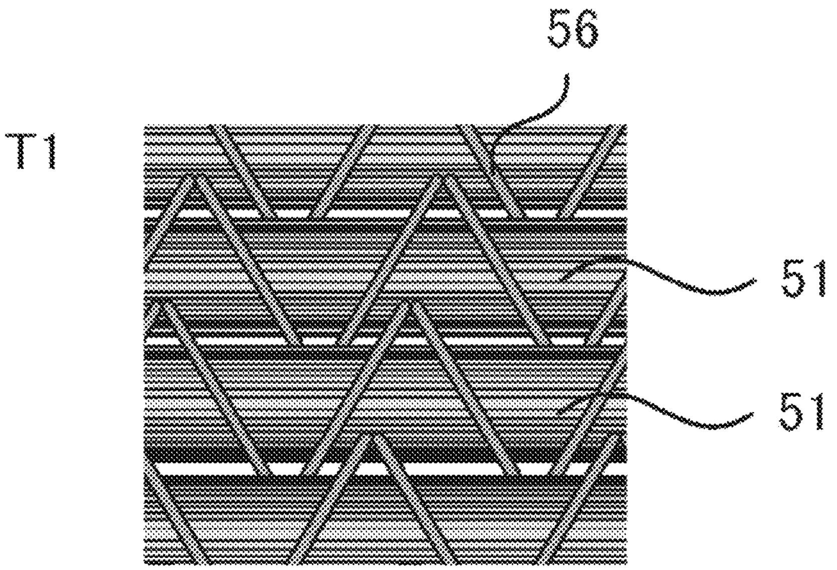
FIG. 14A is an enlarged partial view of area T1 in FIG. 13.
Figure 14B:
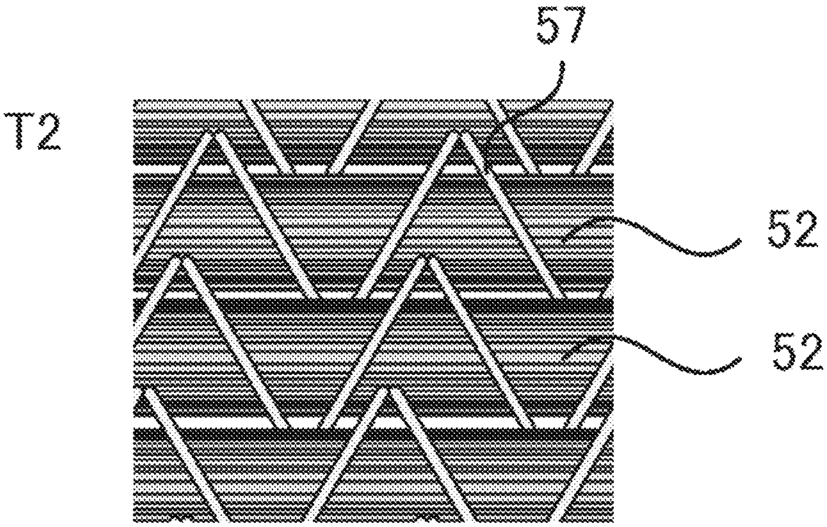
FIG. 14B is an enlarged partial view of area T2 in FIG. 13.

More specifically, as illustrated in FIG. 14A, the first fiber tows 51 are fixed to the base 21 with the water-soluble fixing threads 56. As illustrated in FIG. 14B, the second fiber tows 52 are fixed to the base 21 with the water-insoluble fixing threads 57.

Figure 13:
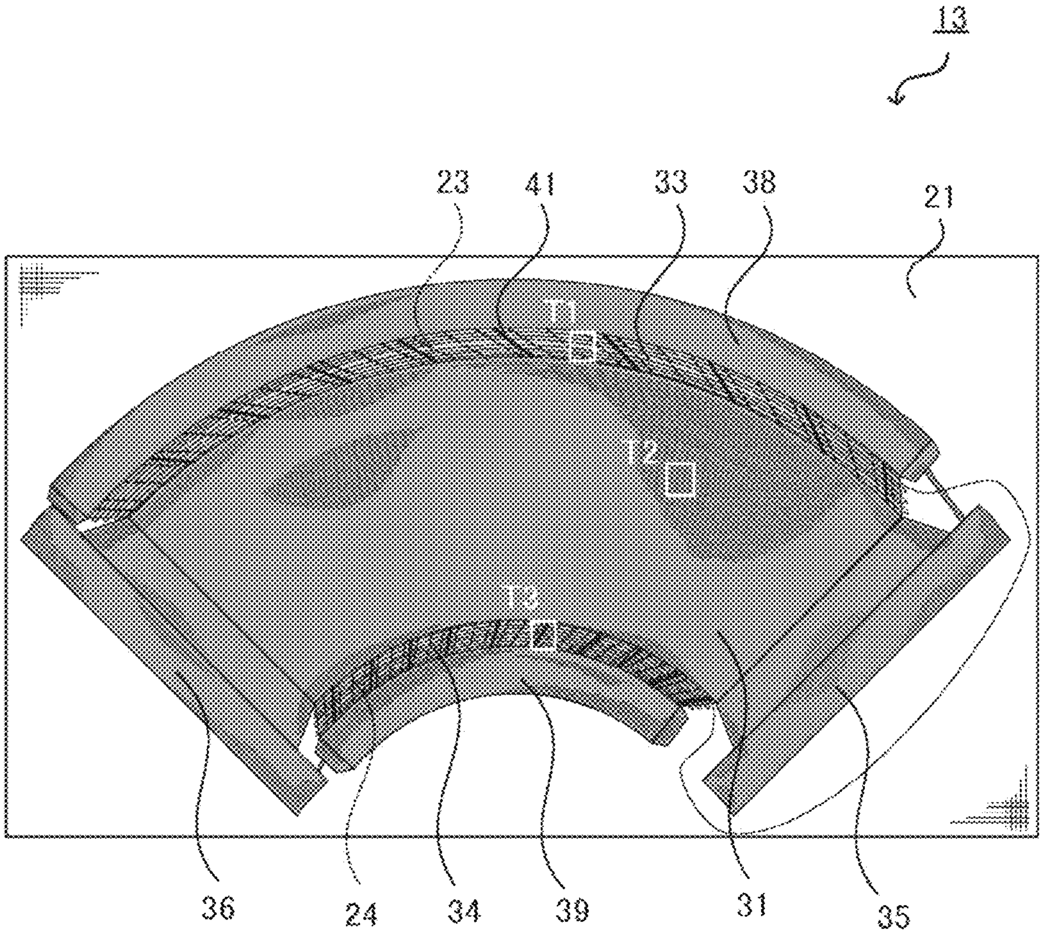
FIG. 13 is a schematic diagram of a fiber preform precursor according to Embodiment 3.
Figure 14C:
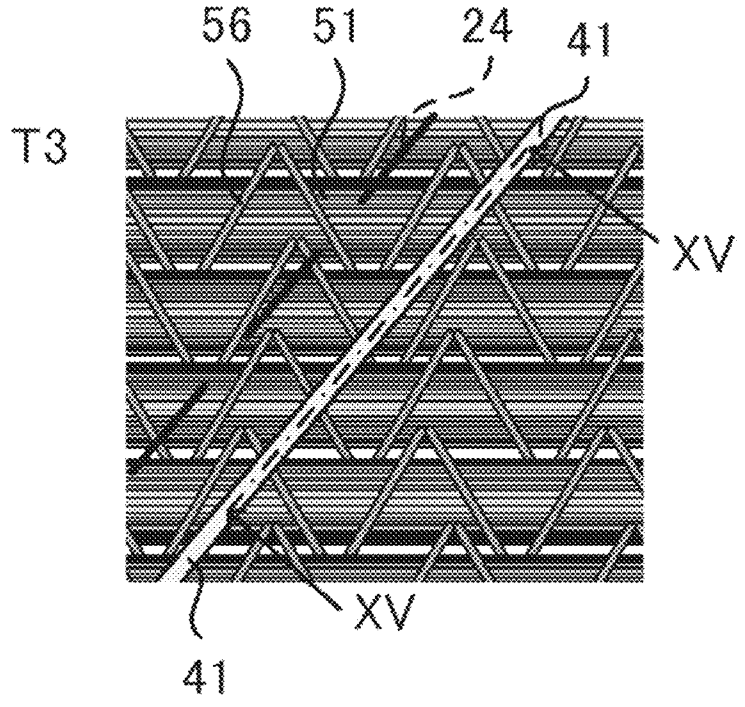
FIG. 14C is an enlarged partial view of area T3 in FIG. 13.

As illustrated in FIG. 13, the fixer 41 extends from the outer periphery 33*a* to the inner periphery 33*b* of the outer taper portion 33, or from the inner periphery 33*b* to the outer periphery 33*a*. The same applies to the inner taper portion 34. The fixer 41 extends from the outer periphery 34*a* to the inner periphery 34*b* of the inner taper portion 34, or from the inner periphery 34*b* to the outer periphery 34*a*. As illustrated in FIG. 14C, the fixer 41 is located across the first fiber tows 51. Parts of the first fiber tows 51 on which the fixer 41 is provided on are fixed to the base 21. The fixer 41 in the present embodiment is, for example, a glue or an elastic adhesive having flexibility, such as a silicone resin.

Figure 15:
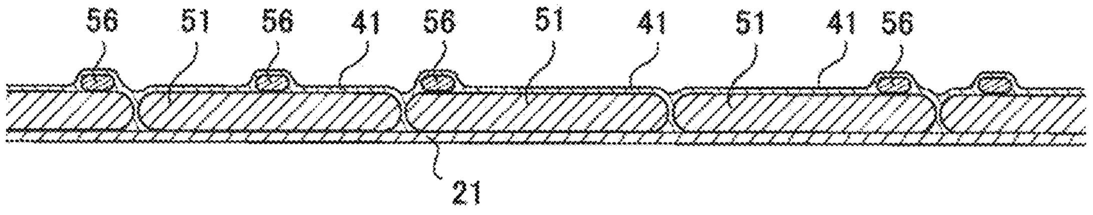
FIG. 15 is a cross-sectional view taken along line XV-XV in FIG. 14C.

FIG. 15 is a cross-sectional view taken along line XV-XV in FIG. 14C. As illustrated in FIG. 15, the fixer 41 is also located between adjacent first fiber tows 51 to fix the first fiber tows 51 to the base 21.

When the water-soluble fixing threads 56 are removed, the fixer 41 restricts the first fiber tows 51 in the outer taper portion 33 and the inner taper portion 34, allowing the first fiber tows 51 to remain unseparated from the base 21.

Figure 16A:
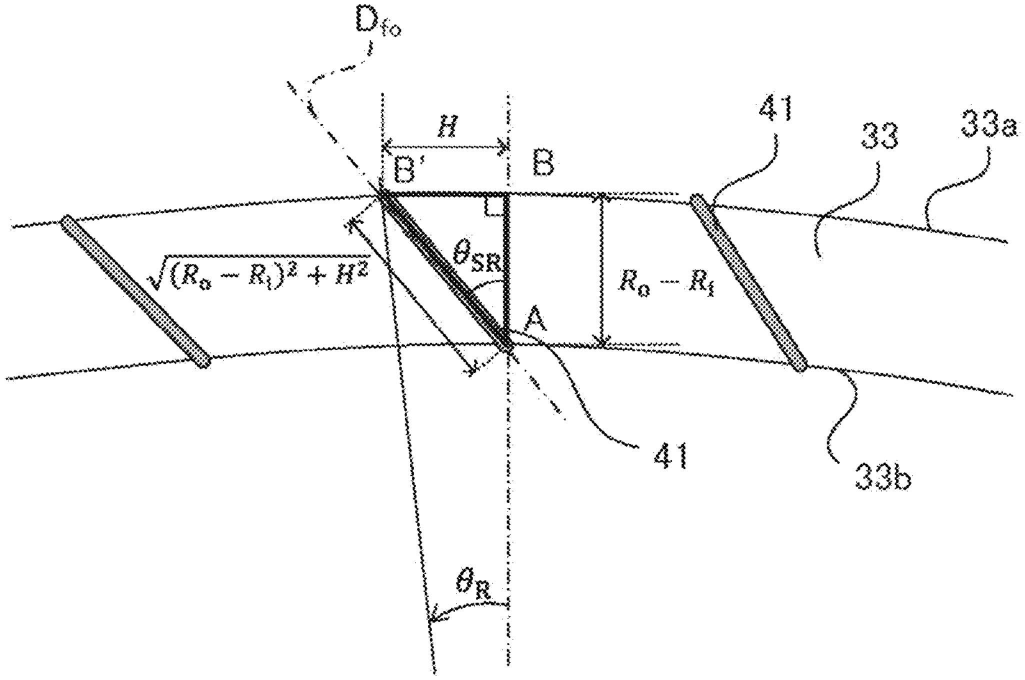
FIG. 16A is a diagram of a fixer on an outer taper portion in Embodiment 3 illustrating the arrangement.

The fixer 41 in the present embodiment may be placed as appropriate in the outer taper portion 33 and the inner taper portion 34. The fixer 41 may be placed at an angle satisfying the conditions below in the outer taper 33. As illustrated in FIG. 16A, the fixer 41 is placed on the line $D_{fo}$ in the outer taper portion 33. The line $D_{fo}$ intersects with the inner periphery 33*b* of the outer taper portion 33 at an intersection. The intersection corresponds to the point A in FIG. 16A. The line extending from the point O to the intersection and the line $D_{fo}$ may be in the direction $\theta_{SR}$ defined by Formula 1.5.

$$\theta_{SR} = \tan^{-1}\frac{H}{R_o - R_i} \tag{1.5}$$

Figure 16B:
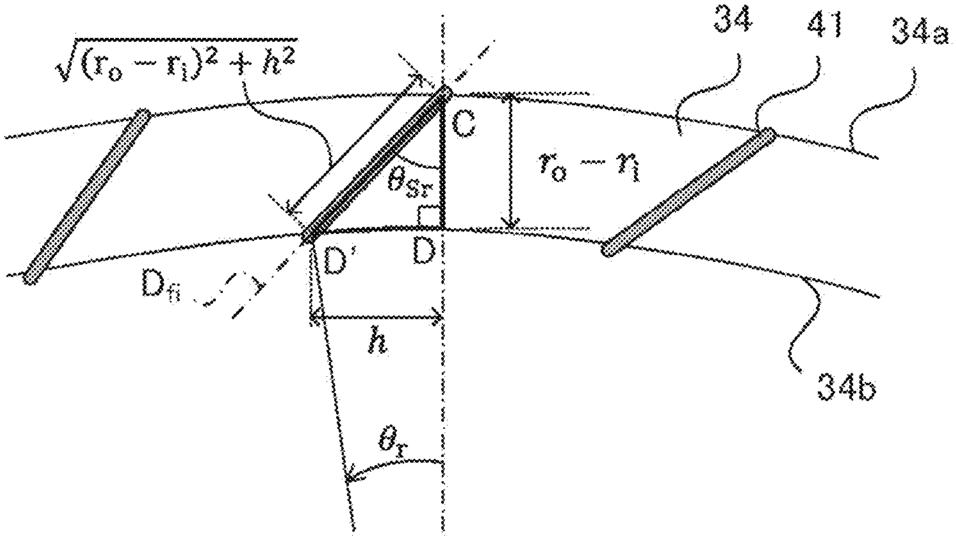
FIG. 16B is a diagram of the fixer on an inner taper portion in Embodiment 3 illustrating the arrangement.

Similarly, the fixer 41 may be placed at an angle satisfying the conditions below in the inner taper portion 34. As illustrated in FIG. 16B, the fixer 41 is placed on the line $D_{fi}$ in the inner taper portion 34. The line $D_{fi}$ intersects with the outer periphery 34*a* of the inner taper portion 34 at an intersection. The intersection corresponds to the point C in FIG. 16B. The line extending from the point O to the intersection and the line $D_{fi}$ may be in the direction $\theta_{Sr}$ defined by Formula 1.6.

$$\theta_{Sr} = \tan^{-1}\frac{h}{r_o - r_i} \tag{1.6}$$

As illustrated in FIG. 16A, the fixer 41 placed in the above manner in the outer taper portion 33 can have the same length as the ridgeline EF of the conical surface of the outer taper portion 33 after forming, with the length of the fixer 41 in the outer taper portion 33 illustrated in FIG. 7. The same applies to the fixer 41 in the inner taper portion 34. This allows, in addition to the fixed first fiber tows 51 to be displaceable relative to one another, the parts of the first fiber tows 51 restricted by the fixer 41 to be placed on the same ridgeline of the conical surface of the outer taper 33 after forming. This thus allows the outer taper portion 33 and the inner taper portion 34 to appropriately form into conical surfaces.

In this case, the outer flange 38 and the inner flange 39 may have the same features as in Embodiment 1. The outer slits 23 and the inner slits 24 may also have the same features as in Embodiment 1.

Embodiment 4

Figure 17:
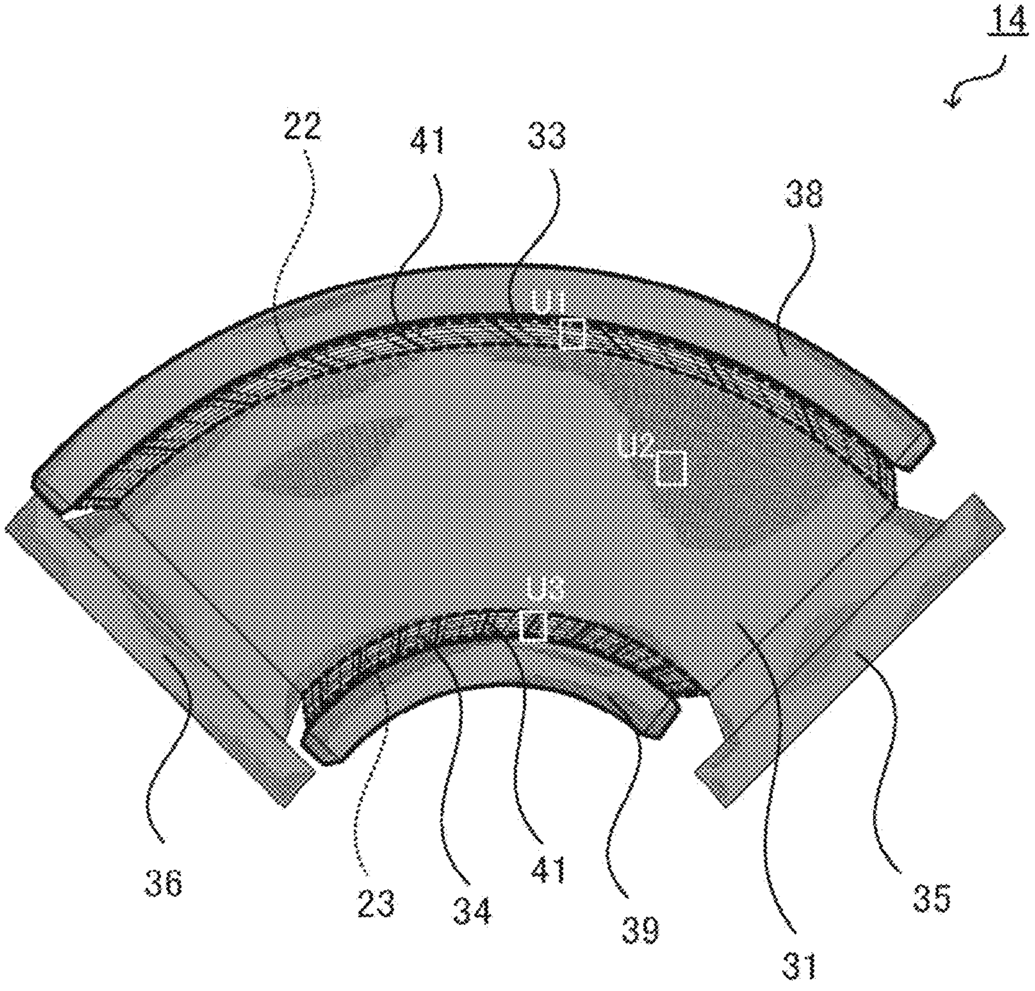
FIG. 17 is a schematic diagram of a fiber preform according to Embodiment 4.
Figure 18A:
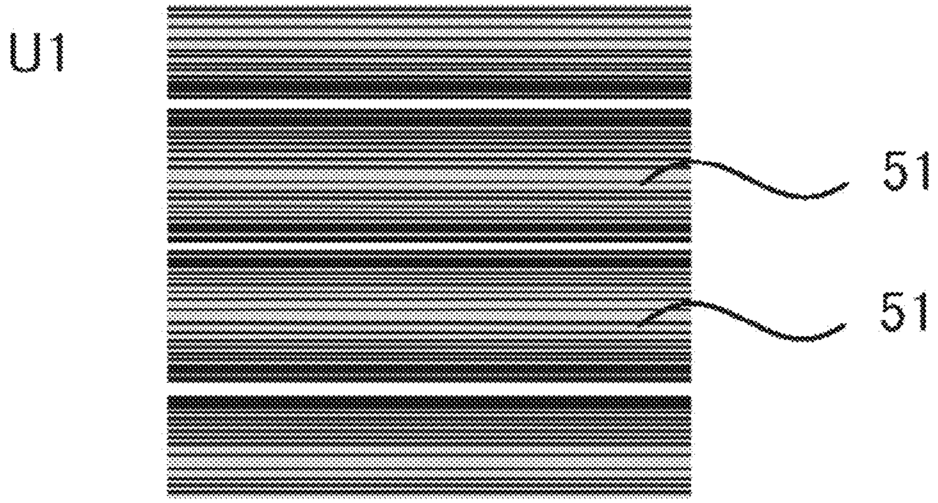
FIG. 18A is an enlarged partial view of area U1 in FIG. 17.
Figure 18B:
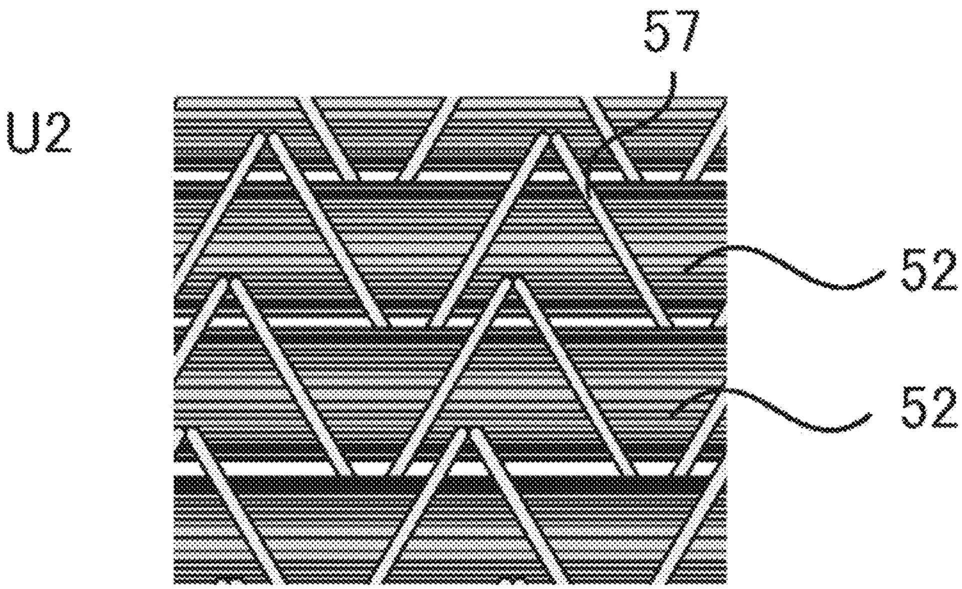
FIG. 18B is an enlarged partial view of area U2 in FIG. 17.
Figure 18C:
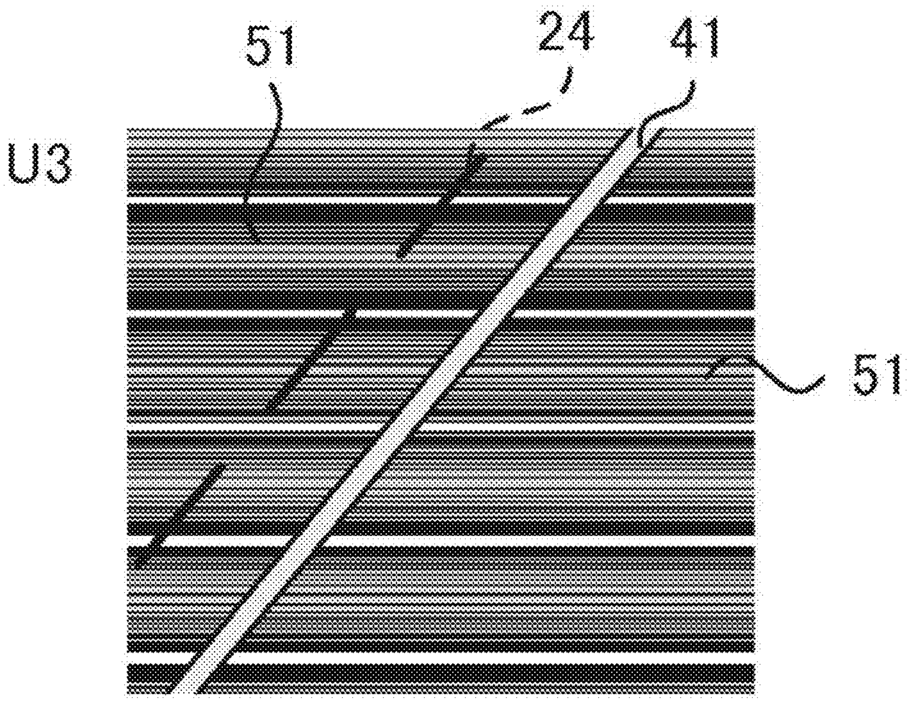
FIG. 18C is an enlarged partial view of area U3 in FIG. 17.

FIG. 17 illustrates a fiber preform 14 according to Embodiment 4. The fiber preform 14 according to the present embodiment is manufactured using the fiber preform precursor 13 according to Embodiment 3. FIGS. 18A to 18C are partial enlarged views of areas U1 to U3 in FIG. 17. Like reference signs denote features common with the features in the above embodiments and are not described in detail.

As illustrated in FIG. 17, a portion of the base 21 including no fiber tow is cut off in the present embodiment.

As illustrated in FIG. 18B, for example, the second fiber tows 52 in the center portion 31 are fixed with the water-insoluble fixing threads 57. As illustrated in FIGS. 18A and 18C, the water-soluble fixing threads 56 fixing the first fiber tows 51 to the base 21 are removed in the outer taper portion 33 and the inner taper portion 34. As schematically illustrated in FIG. 15, the fixer 41 may also be located on the water-soluble fixing threads 56. Although the water-soluble fixing threads 56 are removed with water during manufacture of the fiber preform 14, the water-soluble fixing threads 56 located under the fixer 41 may be left in the fiber preform 14.

With this structure, the first fiber tows 51 are displaceable relative to one another in the outer taper portion 33 and the inner taper portion 34. However, with parts of the first fiber tows 51 fixed with the fixer 41, the first fiber tows 51 can remain unseparated from the base 21. The fiber preform 14 can thus have higher formability. This structure is particularly effective in forming a fiber preform into a shape with a curved surface. The outer flange portion 38, the inner flange portion 39, the outer slits 23, the inner slits 24, and the fixer 41 in the present embodiment may have the same features as in Embodiments 1 and 3. This allows the outer taper portion 33 and the inner taper portion 34 to form into the conical surfaces more appropriately.

Embodiment 5

A method for manufacturing the fiber preform 12 according to Embodiment 5 is described with reference to the drawings.

Figure 19:
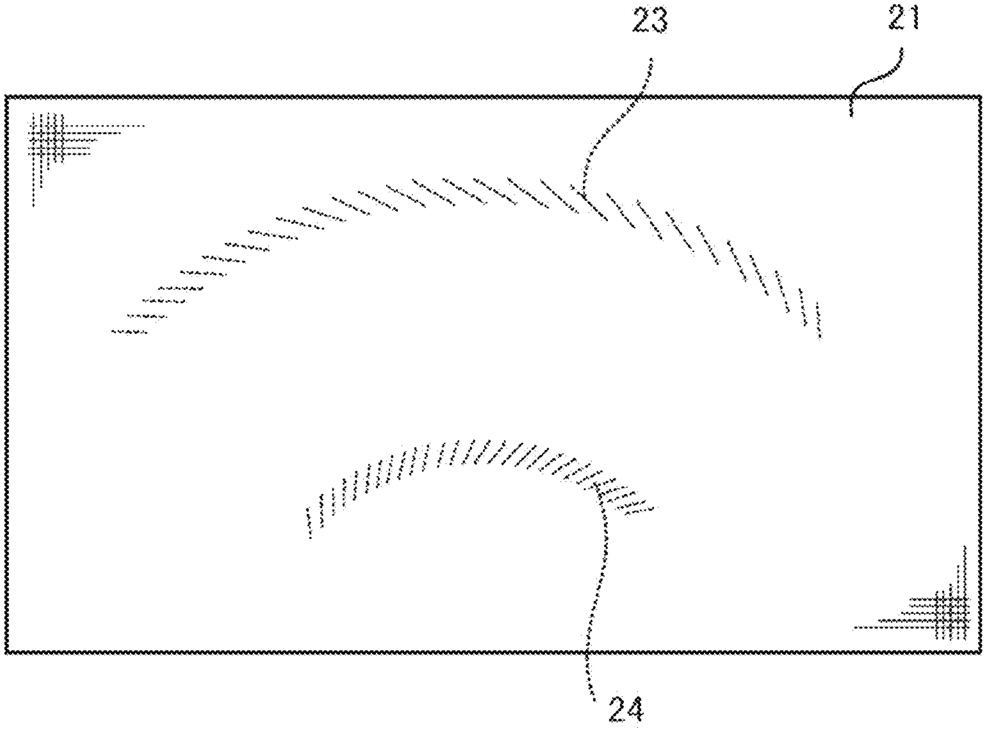
FIG. 19 is a schematic diagram illustrating a method for manufacturing a fiber preform precursor and a fiber preform according to Embodiment 5.

As illustrated in FIG. 19, the dashed outer slits 23 are formed in an area on the base 21 in which the outer taper portion 33 is to be located. Similarly, the inner slits 24 are formed in the base 21 in an area in which the inner taper portion 34 is to be located.

Figure 20:
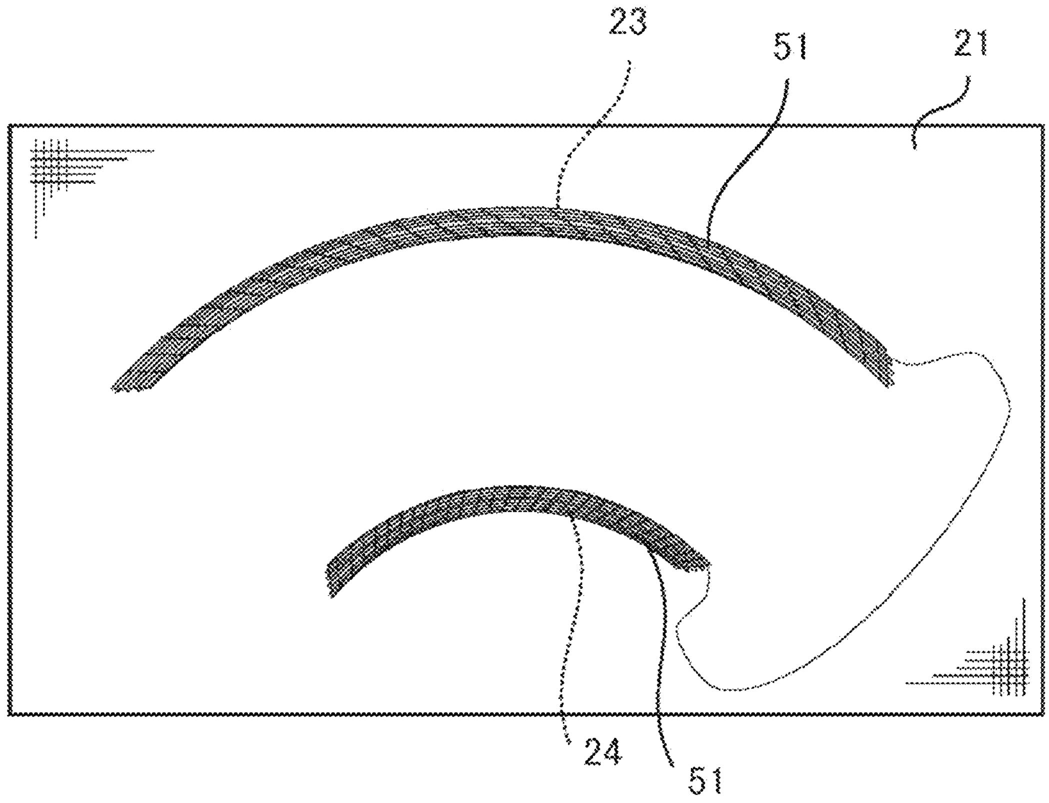
FIG. 20 is a schematic diagram illustrating the method for manufacturing the fiber preform precursor and the fiber preform according to Embodiment 5.

Subsequently, as illustrated in FIG. 20, the first fiber tows 51 are stitched onto the area in which the outer taper portion 33 is to be located with the water-soluble fixing threads 56 using a known automatic sewing machine or a known embroidering machine. Similarly, the first fiber tows 51 are stitched onto the area in which the inner taper portion 34 is to be located with the water-soluble fixing threads 56.

Figure 21:
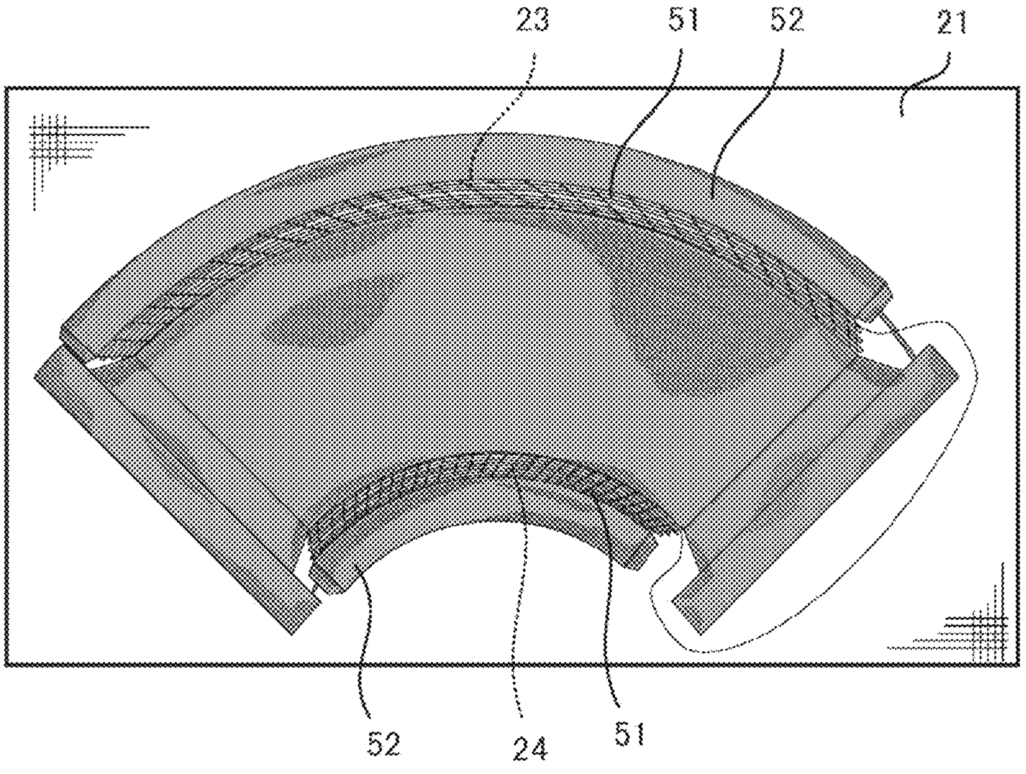
FIG. 21 is a schematic diagram illustrating the method for manufacturing the fiber preform precursor and the fiber preform according to Embodiment 5.

The second fiber tows 52 are then stitched onto areas of the base 21 without the first fiber tows 51 with the water-insoluble fixing threads 57 using a known automatic sewing machine or a known embroidering machine. In the present embodiment, as illustrated in FIG. 21, the second fiber tows 52 are stitched onto the areas in which the center portion 31, the side portions 35 and 36, the outer flange portion 38, and the inner flange portion 39 are to be located.

Figure 22:
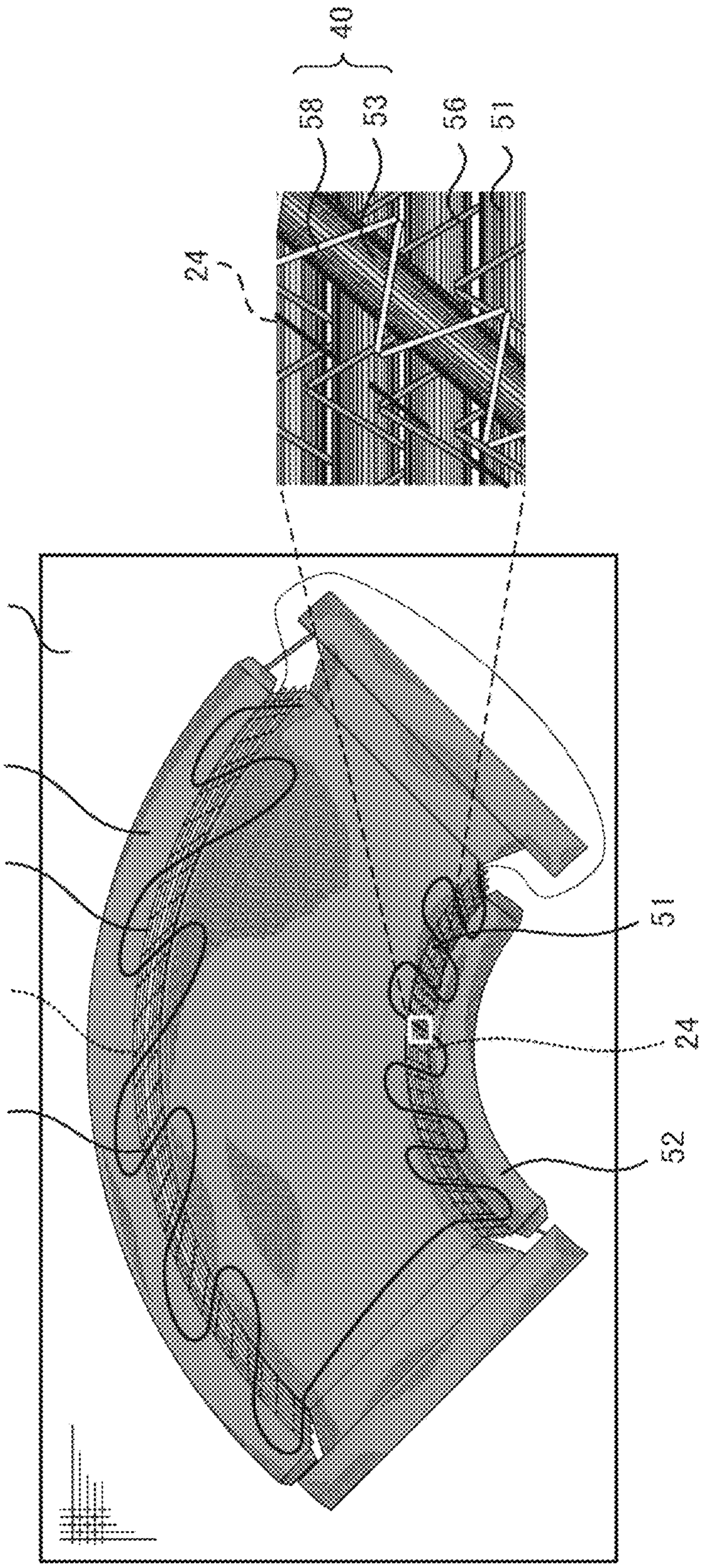
FIG. 22 is a schematic diagram illustrating the method for manufacturing the fiber preform precursor and the fiber preform according to Embodiment 5.
Figure 23:
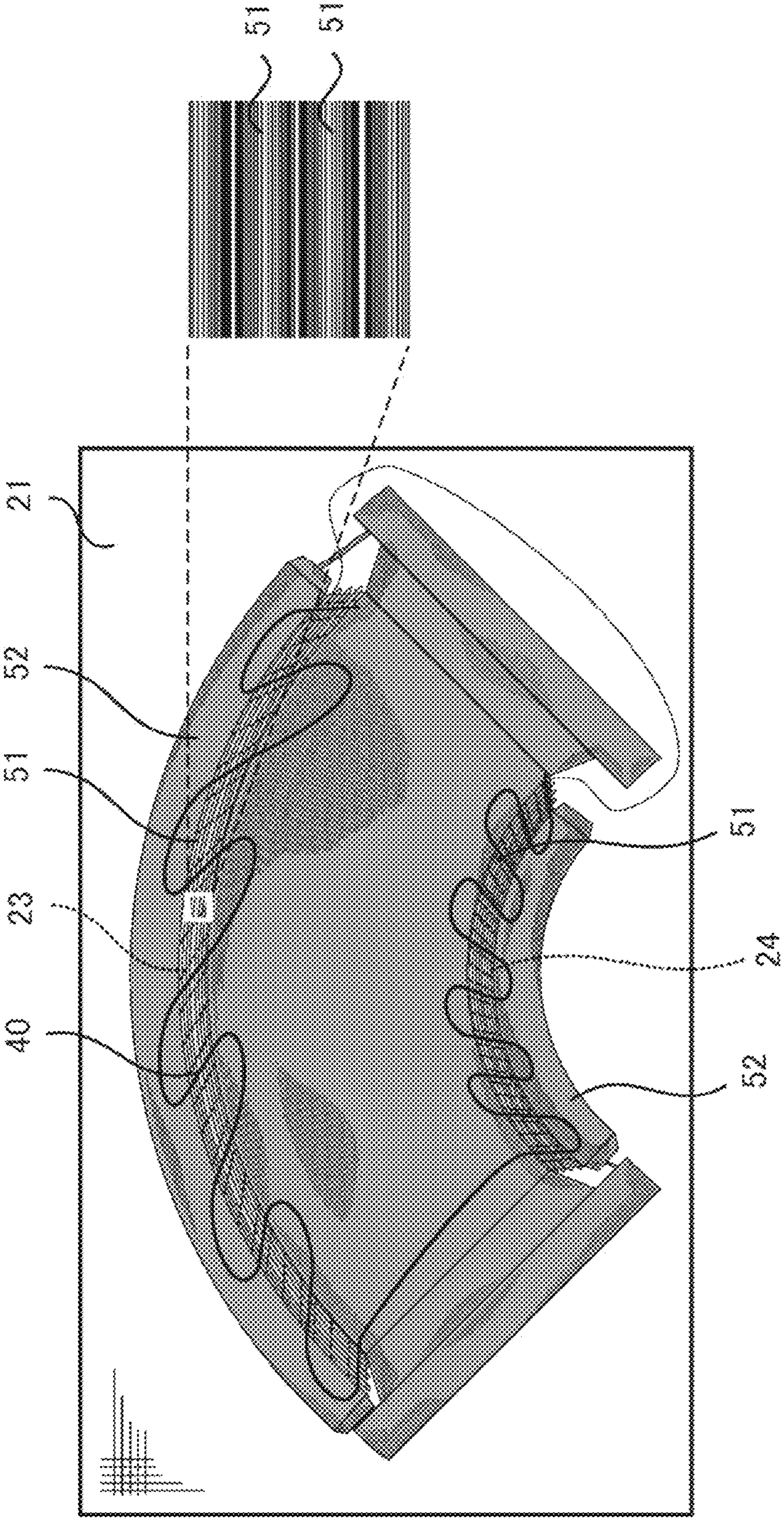
FIG. 23 is a schematic diagram illustrating the method for manufacturing the fiber preform precursor and the fiber preform according to Embodiment 5.

The fixer 40 is then placed across the first fiber tows 51 as illustrated in FIG. 22. More specifically, the third fiber tow 53 is stitched onto the first fiber tows 51 with the water-insoluble fixing thread 58 using a known automatic sewing machine or a known embroidering machine.

The fiber preform precursor 11 is thus manufactured. The outer flange portion 38, the inner flange portion 39, the outer slits 23, the inner slits 24, or the fixer 40 may be formed to satisfy the conditions described in Embodiment 1.

The water-soluble fixing threads in the fiber preform precursor 11 are then removed with water. More specifically, the fiber preform precursor 11 is immersed in water to dissolve the water-soluble fixing threads. The fiber preform precursor 11 may be sprayed with water to dissolve and remove the water-soluble fixing threads. Unnecessary portions of the base 21 may be cut off and removed.

With the above processes, the fiber preform 12 can be manufactured.

With the method for manufacturing a fiber preform according to the present disclosure, parts of the fiber tows remain unseparated from the base and fixed to allow displacement of the fiber tows relative to one another. The fiber preform can thus have higher formability. Additionally, with the manufacturing method according to the present disclosure, the first fiber tows 51 are fixed with water-soluble fixing threads that are easily removable with water. The fiber preform with higher formability can thus be manufactured. Additionally, this method can eliminate creating a cutout in the fiber tows for higher formability and can avoid lowering the rigidity of the formed product.

Embodiment 6

A method for manufacturing the fiber preform 14 according to Embodiment 6 is described with reference to the drawings.

The processes of forming the outer slits 23 and the inner slits 24, stitching the first fiber tows 51, and stitching the second fiber tows 52 are performed in the same manner as in Embodiment 5. The outer flange portion 38, the inner flange portion 39, the outer slits 23, the inner slits 24, or the fixer 41 may be formed to satisfy the conditions described in Embodiment 1 or 3 in the present embodiment as well.

Figure 24:
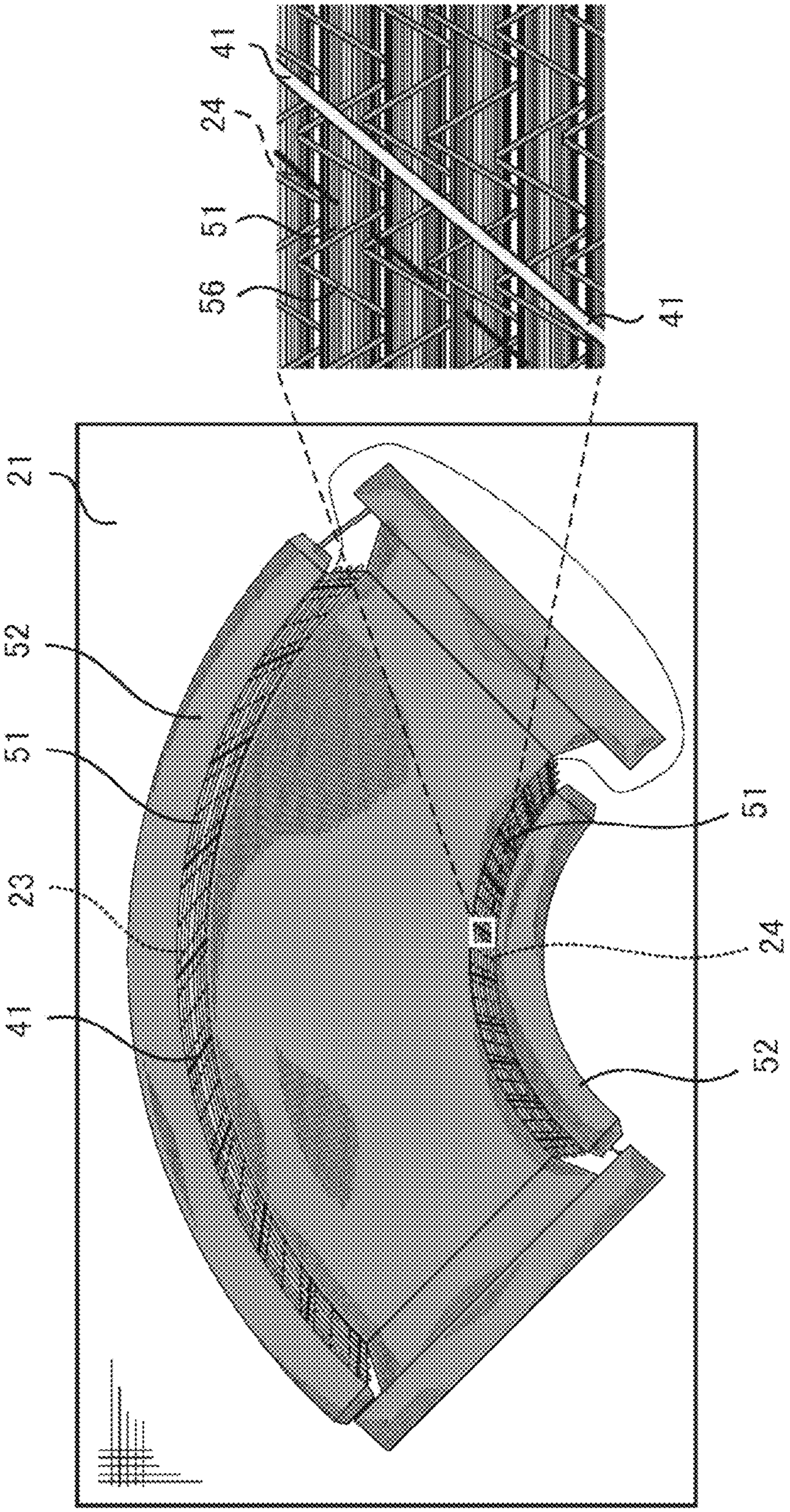
FIG. 24 is a schematic diagram illustrating a method for manufacturing a fiber preform precursor and a fiber preform according to Embodiment 6.

As illustrated in FIG. 24, the fixer 41 is then placed across the first fiber tows 51. More specifically, the fixer 41 is applied to the first fiber tows 51 fixed with the water-soluble fixing threads 56 using an applicator such as a dispenser to bond the first fiber tows 51 to the base 21. When a material to be cured, such as an elastic adhesive, is used for the fixer 41, the process of curing is performed after applying.

The fiber preform precursor 13 is thus manufactured.

The water-soluble fixing threads 56 in the fiber preform precursor 13 are then removed with water. More specifically, the fiber preform precursor 13 is immersed in water to dissolve the water-soluble fixing threads 56. The fiber preform precursor 13 may be sprayed with water to dissolve and remove the water-soluble fixing threads 56. The water-soluble fixing threads 56 under the fixer 41 may remain undissolved. Unnecessary portions of the base 21 may be cut off as appropriate.

With the above processes, the fiber preform 14 can be manufactured.

With the method for manufacturing a fiber preform according to embodiments of the present disclosure, parts of the fiber tows remain unseparated from the base and fixed to allow displacement of the fiber tows relative to one another. The fiber preform can thus have higher formability. Additionally, with the manufacturing method according to the present embodiment, the first fiber tows 51 are fixed with water-soluble fixing threads that are easily removable with water. The fiber preform with higher formability can thus be manufactured. Additionally, this method can eliminate creating a cutout in the fiber tows for higher formability and can avoid lowering the rigidity of the formed product.

The present disclosure is not limited to the above embodiments. For example, in Embodiments 1 and 3, the outer flange portion 38, the inner flange portion 39, the outer slits 23, the inner slits 24, and the fixers 40 and 41 satisfy the conditions described with the formulas. In some embodiments of the present disclosure, all the conditions may not be satisfied, and any one of the conditions alone may be satisfied.

In the above embodiments, the fiber preform precursor and the fiber preform for a partial-disk sandwich panel with a central angle of 90° are illustrated. However, the present disclosure is not limited to the above structure. For example, the central angle or the shape may be changed. Either the outer taper portion 33 or the inner taper portion 34, rather than both, may be included. For example, the fiber preform precursor or the fiber preform to form into a truncated cone may simply include the outer taper portion 33. The features of the above embodiments may be combined as appropriate.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

- 11, 13 Fiber preform precursor
- 12, 14 Fiber preform
- 21 Base
- 23 Outer slit
- 24 Inner slit
- 31 Center portion
- 33 Outer taper portion
- 34 Inner taper portion
- 35, 36 Side portion
- 38 Outer flange portion
- 39 Inner flange portion
- 40, 41 Fixer
- 51 First fiber tow
- 52 Second fiber tow
- 53 Third fiber tow

56 Water-soluble fixing thread
57, 58 Water-insoluble fixing thread
60 Forming mold
61, 62 Conical surface

The invention claimed is:

1. A fiber preform, comprising:

first fiber tows located in a first area on a base;

a second fiber tow located in a second area on the base other than the first area, the second fiber tow being stitched onto the base with a water-insoluble fixing thread; and a fixer located across the first fiber tows to fix parts of the first fiber tows to the base, wherein the fixer is a third fiber tow stitched onto the base with a water-insoluble fixing thread, or the fixer is a glue or an elastic adhesive, the first fiber tows are displaceable relative to one another, and the first area is displaceable relative to the second area.

2. The fiber preform according to claim 1, further comprising:

an outer taper portion to be formed into a conical surface, wherein the outer taper portion is located in the first area.

3. The fiber preform according to claim 2, further comprising:

a center portion located along an inner periphery of the outer taper portion; and an outer flange portion located along an outer periphery of the outer taper portion, wherein the outer taper portion is to be formed into the conical surface by rotating the outer flange portion in a circumferential direction to be placed along a mold, and the outer flange portion is rotated in a direction opposite to a direction in which the outer flange portion is to be rotated in forming, by a length equal to a height of an outer periphery of the center portion after forming.

4. The fiber preform according to claim 2, wherein the outer taper portion has an outer periphery centered on a point O with an outer diameter $R_o$ and an inner periphery centered on the point O with an inner diameter $R_i$, the fiber preform further comprises a center portion located along the inner periphery of the outer taper portion, and the center portion has a height H at its outer periphery after forming, and the base has a dashed slit in an area in which the outer taper portion is located, the slit extends on a line $D_{so}$ from the outer periphery of the outer taper portion to the inner periphery of the outer taper portion, and the line $D_{so}$ forms, with a line extending from the center O to a point at which the line $D_{so}$ intersects with the inner periphery of the outer taper portion, an angle $\theta_{SR}$ defined by Formula 1.3:

$$\theta_{SR} = \tan^{-1}\frac{H}{R_o - R_i} \qquad (1.3)$$

5. The fiber preform according to claim 2, wherein the outer taper portion has an outer periphery centered on a point O with an outer diameter $R_o$ and an inner periphery centered on the point O with an inner diameter $R_i$, the fiber preform further comprises a center portion located along the inner periphery of the outer taper portion, and the center portion has a height H at its outer periphery after forming, and the fixer extends on a line $D_{fo}$ from the outer periphery of the outer taper portion to the inner periphery of the outer taper portion, and the line $D_{fo}$ forms, with a line extending from the center O to a point at which the line $D_{fo}$ intersects with the inner periphery of the outer taper portion, an angle $\theta_{SR}$ defined by Formula 1.5:

$$\theta_{SR} = \tan^{-1}\frac{H}{R_o - R_i} \qquad (1.5)$$

6. The fiber preform according to claim 1, further comprising:

an inner taper portion to be formed into a conical surface, wherein the inner taper portion is located in the first area.

7. The fiber preform according to claim 6, further comprising:

a center portion located along an outer periphery of the inner taper portion; and an inner flange portion located along an inner periphery of the inner taper portion, wherein the inner taper portion is to be formed into the conical surface by rotating the inner flange in a circumferential direction to be placed along a mold, and the inner flange portion is rotated in a direction opposite to a direction in which the inner flange portion is to be rotated in forming by a length equal to a height h of an inner periphery of the center portion after forming.

8. The fiber preform according to claim 6, wherein the inner taper portion has an outer periphery centered on a point O with an outer diameter $r_o$ and an inner periphery centered on the point O with an inner diameter $r_i$, the fiber preform further comprises a center portion located along the outer periphery of the inner taper portion, and the center portion has a height h at its inner periphery inner taper portion after forming, and the base has a dashed slit in an area in which the inner taper portion is located, the slit extends on a line $D_{si}$ from the outer periphery of the inner taper portion to the inner periphery of the inner taper portion, and the line $D_{si}$ forms, with a line extending from the center O to a point at which the line $D_{si}$ intersects with the outer periphery of the inner taper portion, an angle $\theta_{SR}$ defined by Formula 1.4:

$$\theta_{Sr} = \tan^{-1}\frac{h}{r_o \rightarrow r_i} \qquad (1.4)$$

9. The fiber preform according to claim 6, wherein the inner taper portion has an outer periphery centered on a point O with an outer diameter $r_o$ and an inner periphery centered on the point O with an inner diameter $r_i$, the fiber preform further comprises a center portion located along the outer periphery of the inner taper portion, and the center portion has a height h at its inner periphery after forming, and the fixer extends on a line $D_{fi}$ from the outer periphery of the inner taper portion to the inner periphery of the inner taper portion, and the line $D_{fi}$ forms, with a line extending from the center O to a point at which the line $D_{fi}$ intersects with the outer periphery of the inner taper portion, an angle $\theta_{SR}$ defined by Formula 1.6:

$$\theta_{Sr} = \tan^{-1}\frac{h}{r_o - r_i} \tag{1.6}$$

10. The fiber preform according to claim 1, wherein
the base has a dashed slit in the first area,
the slit has a plurality of openings arranged linearly, and
the portions of the base between the plurality of openings adjacent to each other are cut through shear deformation of the base in forming to connect the plurality of openings with each other.

11. A fiber preform precursor for manufacturing the fiber preform according to claim 1, wherein
the first fiber tows are stitched onto the base with a water-soluble fixing thread.

12. A method for manufacturing a fiber preform, comprising:

manufacturing a fiber preform precursor, the manufacturing including
stitching first fiber tows onto a first area of a base with a water-soluble fixing thread,
stitching a second fiber tow onto a second area of the base other than the first area with a water-insoluble fixing thread, and
placing a fixer across the first fiber tows to fix parts of the first fiber tows to the base; and
dissolving the water-soluble fixing thread in the fiber preform precursor with water to remove the water-soluble fixing thread, wherein
the fixer is a third fiber tow stitched onto the base with a water-insoluble fixing thread, or the fixer is a glue or an elastic adhesive,
the first fiber tows are displaceable relative to one another, and
the first area is displaceable relative to the second area.

* * * * *